United States Patent
Miyake et al.

[11] Patent Number: 5,997,675
[45] Date of Patent: *Dec. 7, 1999

[54] METHOD OF MOLDING USING A COVERING SHEET HAVING MINUTE UNEVENNESS ON THE SURFACE THEREOF

[75] Inventors: Akitaka Miyake, Ibaraki; Tomoko Uematsu, Osaka; Toshimitsu Tsuji, Kyoto, all of Japan

[73] Assignee: Sekisui Kagaku Kogyo Kabushiki Kaisha, Osaka, Japan

[*] Notice: This patent is subject to a terminal disclaimer.

[21] Appl. No.: 09/116,081

[22] Filed: Jul. 15, 1998

Related U.S. Application Data

[62] Division of application No. 08/624,617, filed as application No. PCT/JP94/01256, Jul. 29, 1994, Pat. No. 5,817,402.

[51] Int. Cl.⁶ ............... B29C 51/00; B32B 3/00
[52] U.S. Cl. ............ 156/222; 264/510; 264/512; 264/513; 264/514; 264/259; 264/266; 156/78; 156/221; 156/244.24; 156/244.25
[58] Field of Search ............ 264/510, 511, 264/512, 513, 514, 259, 266, 45.3, 45.9, 46.1, 46.4; 156/77, 78, 244.24, 244.25, 221, 222; 428/159, 160, 172, 315.9, 317.1, 317.9

[56] References Cited

U.S. PATENT DOCUMENTS

| | | | |
|---|---|---|---|
| 4,293,456 | 10/1981 | Reischl | 156/62.2 |
| 4,461,797 | 7/1984 | Adachi et al. | 428/147 |
| 4,550,049 | 10/1985 | Ono et al. | 428/147 |
| 4,656,199 | 4/1987 | Neiderdellmann et al. | 521/79 |
| 4,995,930 | 2/1991 | Merz et al. | 156/222 |
| 5,354,397 | 10/1994 | Miyake et al. | 156/77 |
| 5,626,382 | 5/1997 | Johnson et al. | 296/146.7 |
| 5,851,624 | 10/1998 | Ang et al. | 428/159 |

FOREIGN PATENT DOCUMENTS

| | | |
|---|---|---|
| 0 529 094 A1 | 3/1993 | European Pat. Off. |
| 56-78148 | 5/1981 | Japan |
| 56-198145 | 12/1981 | Japan |
| 58-78592 | 5/1983 | Japan |
| 61-96011 | 4/1986 | Japan |
| 63-19242 | 8/1988 | Japan |

*Primary Examiner*—Jan H. Silbaugh
*Assistant Examiner*—Dae Young Lee
*Attorney, Agent, or Firm*—Kinney & Lange, P.A.

[57] ABSTRACT

A composition containing thermoplastic elastomer and elastic fine particles is extruded into a sheet-like shape from an extruder. Then, by expanding this sheet-like shape member, a covering sheet having minute unevenness attributable to the elastic fine particles formed on the surface is produced. The covering sheet may have an adhesive layer, a substrate layer, a foamed resin layer, etc., on the opposite side to the surface having a matt feeling. Such covering sheet can be produced with good productivity without creating environmental problems such as a problem related to solvent, etc. By molding using the covering sheet, a molding having matt feeling can be obtained.

6 Claims, 9 Drawing Sheets

METHOD OF MOLDING USING A COVERING SHEET HAVING MINUTE UNEVENNESS ON THE SURFACE THEREOF

This is a divisional of application Ser. No. 08/624,617, filed May 23, 1996, now U.S. Pat. No. 5,817,402, which is a 371 National Phase of application Ser. No. PCT/JP94/01256, filed Jul. 29, 1994.

TECHNICAL FIELD

The present invention relates to a covering sheet which can give matt feeling and, furthermore, preferred soft touch feeling, to a portion where people may touch, e.g., interior of automobiles, architectural interiors, housings of office automation equipment, household electrical goods, etc., stationery, sanitary goods, and daily necessities; and to a method of producing the sheet and a molding using the sheet.

BACKGROUND ART

In order to provide surfaces of plastic moldings or metallic moldings with matt feeling (for example, suede-like soothing external appearance), suede-like covering coats are formed using paints or a sheet for moldings obtained by using paints.

For example, a suede-like sheet for molding is proposed in Japanese Laid-Open Patent Publication No. 2-41243 which is obtained as follows. The matt paint which includes a bead pigment and an ionizing radiation curable resin vehicle is coated onto a base film having good moldability and cured.

However, since it is necessary to cure the ionized radiation curable resin composition by irradiation with an electron beam, etc. after the application thereof on a film, production steps for the sheet become complicated and the productivity is not satisfactory. Moreover, since a coating film of the sheet is made of a resin which is crosslinked using an electron beam, etc., the extensibility of the entire sheet is poor.

Japanese Laid-Open Patent Publication No. 59-202830 proposes an apparatus in which a molding is decorated while being engaged in injection molding using the sheet.

When the sheet disclosed in above-mention Japanese Laid-Open Patent Publication No. 2-41243 and the apparatus proposed in Japanese Laid-Open Patent Publication No. 59-202830 are incorporated in an attempt to obtain a molding having a soft touch feeling on the surface, the following problem arises.

When attempts are made to adhere the sheet onto the surface of the molding having unevenness or curves, there is a risk of the sheet being cracked since the extensibility of the sheet is poor. In particular, it is difficult to easily give matt feeling and soft touch feeling to the molding in deep draw forming.

Furthermore, Japanese Laid-Open Patent Publication No. 62-251111 proposes a method of producing a molding, comprising the steps of: previously placing a thermoplastic resin sheet in a mold; introducing a resin in the mold; and pressing the resin in the mold with a cope, thereby obtaining a molding having the thermoplastic resin sheet (decorating sheet) adhered to the surface thereof.

However, the molding obtained by the method proposed in Japanese Lain-Open Patent Publication No. 62-251111 does not produce matt feeling since its surface layer is formed only of the thermoplastic resin and minute unevenness is not formed on the surface. Also, touch feeling is rather stiff. Therefore, this production method cannot be used to produce products which require matt feeling or soft touch feeling to the human skin, e.g., interior of automobiles, housings, cases, etc.

DISCLOSURE OF THE INVENTION

The present invention overcomes the above-mentioned problems, and has the features of providing a covering sheet which has matt condition on its exterior and, furthermore, which has a soft touch feeling; a method of producing the same with good productivity without creating problems associated with conventional painting space or environmental problems associated with using solvents; and a method of producing a molding using the covering sheet.

Another feature of the present invention is to provide a method which can produce the above-mentioned covering sheet at relatively low cost.

A covering sheet of the present invention is made of a composition containing urethane type thermoplastic elastomer and elastic fine particles as main components. A surface layer having minute unevenness on the surface thereof, an adhesive layer, and a substrate layer comprising an olefin type thermoplastic elastomer are laminated in this order to form the covering sheet.

In a method of producing the covering sheet of the present invention, the composition containing the thermoplastic elastomer and the elastic fine particles as main components is extruded, and then expanded, thereby obtaining the covering sheet having minute unevenness on the surface.

Since the covering sheet obtained in the method of the present invention is formed of the composition containing the thermoplastic elastomer and the elastic fine particles as main components, and since the covering sheet has the surface layer having minute unevenness on the surface; matt feeling on the appearance, and generally, soft touch feeling can be given to a surface of a molding.

According to the method of producing the covering sheet of the present invention, minute unevenness is formed on the surface by extruding the composition containing the thermoplastic elastomer and the elastic fine particles as main components into a sheet-like shape, and then by expanding it. Therefore, it is not necessary to use a solvent and the sheet can be produced in good working environment. Moreover, since the sheet may be produced in a co-extruding method in a case where the covering sheet has a substrate layer, it is possible to perform continuous production in a single step unlike the case where a paint is applied after the production of the substrate layer. Minute unevenness refers to the presence of bumps or waviness on the surface.

Therefore, a covering sheet which has matt feeling on its appearance, and generally, a soft touch feeling can easily be produced with considerably good productivity without creating conventional problems associated with a paint space or an environmental problem associated with using solvents, and the like.

(Thermoplastic elastomer)

The thermoplastic elastomer for use in the present invention refers to a polymeric material which exhibits what is called rubber elasticity at room temperature and is capable of being plasticized into a variety of moldings at high temperature.

Examples of the above-mentioned thermoplastic elastomer include polyurethane type, polystyrene type, polyolefin type, polyester type, polyvinyl chloride type, polyamide type, ionomer type, fluororubber, 1,2-polybutadiene type, trans 1,4-polyisoprene type, synthetic natural rubber type, etc., which can be used either alone or in combination.

It is often the case that thermoplastic elastomer generally includes within a molecule both a rubber component (soft segment) having entropy elasticity and a molecular binding component (hard segment) preventing plastic deformation, and it sometimes includes a partial crosslinkage structure in a moldable range. However, it does not include an extensive, 3-dimensional network crosslinkage structure.

Hardness of the thermoplastic elastomer is preferably in the range of 20 to 98 in A hardness of JIS K6301, although it differs depending on the degree of touch feeling desired and the hardness of elastic fine particles (elastic beads are often used) to be used.

Specific examples of the above-mentioned thermoplastic elastomer of polyurethane type include block copolymer having polyurethane as hard segment, and polyether, polyester, polycarbonate, etc. as soft segment.

Specific examples of polystyrene type include block copolymer which has polystyrene as hard segment, and which has polybutadiene, polyisoprene, polyethylene-polybutylene as soft segment (referred to as SBS, SIS, SEBS block copolymers, respectively); and a block copolymer in which said block copolymer is further hydrogenated or supplemented with additional functional groups.

Specific examples of polyolefin type include those which have polyolefin such as polypropylene as a hard segment, and which have ethylene as a soft segment (referred to as EPM (ethylene-propylene-methylene bonding)); those which have a polyolefin such as polypropylene as a hard segment, and which have a small amount of diene component together with ethylene as a soft segment (referred to as EPDM (ethylene-propylene-dienemethylane bonding), EPM and EPDM together being called EPR (ethylene-propylene rubber)): those which are obtained by blending the above; those which are partially crosslinked by further adding an organic peroxide; those which are graft-modified with a derivative of an unsaturated hydroxy monomer or unsaturated carboxylic acid; butyl rubber graft polyethylene, etc. The hard segment and the soft segment can be blended either after the preparation of each as described above or during polymerization.

Specific examples of polyester type include copolymers which have polyester as a hard segment and polyether as a soft segment, etc.

Examples of polyvinyl chloride type include those obtained by a method where degree of polymerization of polyvinyl chloride is raised to the extreme (polyvinyl chloride of high degree of straight chain polymerization; degree of polymerization being in the range of about 2000 to about 2500), a method where a 3-dimensional crosslinkage structure is introduced to a part of polyvinyl chloride, a method where an ion crosslinkage structure is introduced to a part of polyvinyl chloride, etc.

Examples of polyamide type include those which include polyamide as hard segment and polyether as soft segment.

Selection of a specific thermoplastic elastomer is made by considering the particular performance characteristics of a covering sheet to be obtained. For example, if scratch resistance, abrasion resistance, and excellent touch feel and appearance are desired, thermoplastic elastomers of the urethane type are preferably used. As the urethane type elastomer, if light resistance and heat resistance are desired for a covering sheet, non-yellowing type using an aliphatic isocyanate, etc. is preferably used.

(Elastic fine particles)

Elastic fine particles which do not melt under extruding conditions for the above-mentioned thermoplastic elastomer, i.e., elastic fine particles having a softening temperature higher than the extruding temperature of the thermoplastic elastomer are used. The reason is as follows. If elastic fine particles are melted to become integrated with the thermoplastic elastomer when they are mixed in the thermoplastic elastomer and extruded from an extruder, then even if the sheet is expanded later, it becomes difficult to form unevenness of a desired size and shape on the sheet surface.

An elastic fine particle used in the present invention is a fine particle having the property that it elastically recovers when pressure is applied until the shape deforms and then is released. For example, an elastic bead having a diameter of 50 $\mu$m which requires a weight of 0.5 to 30 gf in order to be pressed to a height of 40 $\mu$m on a plane of a truncated cone is preferable. Particularly, those requiring 0.5 to 10 gf are preferable.

Usually, a non-natural elastic fine particle is used. Examples include those made of polyurethane, an acrylic resin (preferably an acrylic-urethane resin), polystyrene, styrene-isoprene copolymer, etc.

Although these elastic fine particles preferably have a spherical shape, those which are obtained by a method such as freeze crush and have a non-spherical shape can also be used.

A mean particle diameter of the elastic fine particle is usually in the range of 1 to 50 $\mu$m, preferably in the range of 5 to 40 $\mu$m, but generally 20 to 200 parts by weight, or preferably 50 to 150 parts by weight thereof are added to 100 parts by weight of the above-mentioned thermoplastic elastomer.

If the mean particle diameter of the elastic fine particle falls below 1 $\mu$m, it becomes difficult to obtain a covering sheet having sufficient soft touch feeling (somewhat of a dampish touch feeling when touched). If the diameter further becomes extremely small, matt feeling cannot be produced. On the other hand, if the mean diameter of the elastic fine particle exceeds 50 $\mu$m, it becomes likely that a crack may appear on a surface of a covering sheet when it is spread and drawn. Also, if an addition amount with respect to 100 parts by weight of the thermoplastic elastomer is less than 20 parts by weight, it becomes difficult to form minute unevenness on the surface of the covering sheet and, consequently, matt feeling or soft touch feeling of the covering sheet decreases. If the addition amount is more than 200 parts by weight, a crack may be easily formed on the surface of the covering sheet when it is spread and drawn.

Also, the kinds of elastic fine particles are not limited to one, but instead, two or more kinds of elastic fine particles can be used in combination. When a relatively flexible thermoplastic elastomer is used, or when a slight stiffness on the surface of the covering sheet is acceptable, crosslinked polymethyl methacrylate or hard fine particles made of inorganic materials can be used with the above-mentioned elastic fine particles.

(Covering sheet)

A construction of a "covering sheet" of the present invention is as follows.

(1) For example, a sheet having a surface layer, an adhesive layer, and a substrate layer laminated in this order is described as follows.

The surface layer is made of a composition containing a urethane type thermoplastic elastomer and elastic fine particles as main components, and as a result has minute unevenness on the surface thereof.

The substrate layer is made of an olefin type thermoplastic elastomer. The adhesive layer for the two layers mentioned above is preferably a layer made of a polyolefin (particularly polypropylene) modified by an amid such as unsaturated polybasic acid or of SEBS (styrene-ethylene-butylene-styrene copolymer) further modified by an acid such as unsaturated polybasic acid, although this does not particularly limit the choice.

Since the construction is such that the surface layer and the substrate layer are laminated with the adhesive layer interposed therebetween, an amount of the elastic fine particles to be used can be reduced by dispersing the particles only in the surface layer of the covering sheet compared to the case where the elastic fine particles are dispersed in an entire laminated layer. Also, in a case where a melted resin and the covering sheet are integrated during production of, for example, a molding by injection molding or injection press molding, the adhesiveness of the two layers can be made excellent by having the substrate layer made of the same molding resin.

A detailed construction of each layer, including minute unevenness of the surface layer, is to be described in the section "method of producing the covering sheet" in the specification.

(2) A sheet having a surface layer, an adhesive layer, a substrate layer, and a foamed resin layer laminated in this order is described as follows.

A construction of the surface layer, the adhesive layer, and the substrate is the same as in the case (1) above. Examples of the foamed resin layer include foamed layers made of a polyolefin type resin, a polystyrene type resin, a polyurethane type resin, a polyvinyl chloride type resin, a variety of thermoplastic elastomer resins, etc. In particular, the use of a foamed layer made of the polyolefin type resin is preferable in that it has excellent adhesiveness to an olefin type thermoplastic elastomer substrate layer, has an excellent cushioning properties, and enhances soft touch feeling of the surface layer when pressed.

(Method of producing the covering sheet)

The "method of producing the covering sheet" will be described below.

(1) Production of the covering sheet made of a single layer is described as follows.

The covering sheet is obtained by melt-kneading a composition containing a thermoplastic elastomer, elastic fine particles and, if necessary, an additive, extruding it in a sheet-like shape using a kneading extruder such as a biaxial extruder, and then expanding the sheet in the longitudinal direction, and optionally, in the width direction.

Known conditions for extruding a thermoplastic elastomer may be generally employed as conditions for the above-mentioned extruding, although they depend on the identity and mixing ratio of the thermoplastic elastomer, the elastic fine particles, and the additive. For example, it is possible to perform extrusion in a temperature range of 150 to 215° C. when thermoplastic urethane elastomer is used as the thermoplastic elastomer.

Instead of mixing the thermoplastic elastomer, the elastic fine particles, and the additive, and then melt kneading and extruding the composition by the biaxial extruder, a uniaxial extruder may be used if the above-mentioned components are mixed by a Benbury mixer and pelletized by a pelletizer, etc.

An expansion of the above-mentioned sheet-like body can be conducted in half-solid state immediately after extrusion if the sheet-like shape is maintained. Certainly, it can also be conducted in solid state (generally referred to as drawing in this case). Specifically, the above-mentioned composition in the sheet-like shape immediately after extrusion (discharge) from the extruder can be expanded by pulling rollers, etc. Alternatively, it can be expanded after cooling and forming the composition in the sheet-like shape enough to be rolled. Furthermore, the extruder (metal mold) can be arranged in such a manner that the composition of the sheet-like shape be extruded vertically down and the sheet be expanded by its own weight.

The drawing of the sheet is usually performed as follows. The temperature of the sheet is lowered below the softening temperature of the thermoplastic elastomer used. The sheet makes contact with cooled rollers, and is received by pulling rollers which are provided on the extruding side of said cooled roller and are rotating with speed faster than the extrusion speed of the sheet. If pulling rollers, such as cooled rubber rollers whose surface is processed for roughness, are used, the sheet can be expanded by these rollers in the vicinity of the softening temperature of the thermoplastic elastomer. Tenter expanding method can also be employed.

A term "sheet-like body" in the present invention includes both a half solid state immediately after the extrusion and a solid state after sufficient cooling (so does a sheet-like shape laminated member to be described in section (2) and beyond).

The expandability of the sheet is usually 1.2 or greater, preferably in the range of 2 to 50, or more preferably in the range of 2 to 20 although it varies depending on the miscibility of the elastic fine particles and the thermoplastic elastomer to be used, the hardness of the elastic fine particles, and the softening temperature of the thermoplastic elastomer.

The expandability K of the sheet is given by the formula below:

$$K = \text{(area of cross-section of metal mold lip)/(area of cross-section of the received sheet).}$$

As described above, by expanding the sheet, a sheet having minute unevenness on the surface attributable to the elastic fine particles is obtained. Since light is scattered by the minute unevenness, the covering sheet obtained produces matt feeling when viewed and soft touch feeling (suede-like feeling) when touched.

The reason why minute unevenness is formed on the surface of the covering sheet is conjectured as follows.

As shown in FIG. 1, when the sheet 40 extruded from the extruder is expanded, the layer 44 made of the thermoplastic elastomer is stretched in the direction of expansion of the sheet 40 and a thickness of the thermoplastic elastomer layer 44 gradually becomes small while the elastic fine particles 41 contained in the sheet 40 hardly deform. As a result, portions of the thermoplastic elastomer layer 44 surrounding the elastic fine particles 41 become thin, thereby forming convexs 43 on the sheet surface 42.

Preferably, configuration of the unevenness formed on the covering sheet is as follows.

As described above, the minute unevenness on the surface of the covering sheet is produced by the added elastic fine particles disposed on the surface thereof. The convex is formed by one or a congregation of a plurality of the added elastic fine particles.

As shown in FIG. 2, the width of the convex 29 is preferably in the range of 1 to 50 $\mu$m on average, or more preferably in the range of 4 to 30 $\mu$m on average although it may change depending on the size of the added elastic fine particle. The reason for this is as follows. If the width W of the convex 29 is too small, then it becomes difficult to obtain matt feeling or excellent touch feeling. On the other hand, if the width W is too large, then a crack easily appears on the surface when the covering sheet is being spread, although it depends on the precise thickness of the covering sheet. Touch feeling also becomes poor and matt finish becomes unsatisfactory.

A width of the convex 29 is defined to be a length between the lowermost points on both sides of the convex 29 as indicated in FIG. 2.

A density of the unevenness is preferably 10 particles per 0.01 mm² or greater, or more preferably 15 to 100 particles per 0.01 mm², although it may vary depending on the size of the added elastic fine particles. It in also preferable that the unevenness is formed continuously. if the density of the unevenness is less than that in the above-described ranges, then matt feeling becomes unsatisfactory.

The matt feeling of the covering sheet can be measured, for example, in terms of specular glossiness. In that case, the gloss value measured in conformity with JIS K7105 is preferably 5 or less, and more preferably 3 or less, in terms of 60° specular gloss.

Roughness of the covering sheet is preferably in the range such that Rz·D=5 to 50 μm, or more preferably Rz·D=5 to 35 μm in terms of ten-point mean roughness measuring a length of 4 mm with cut-off value being equal to 0.8 mm.

Here, the cut-off value refers to a wavelength for which the gain becomes 75% when a high frequency filter having an attenuation rate of −12 dB/oct is used in finding a roughness curve.

The ten-point mean roughness Rz·D is a value obtained as follows. A portion of the measuring length L is taken out from the roughness curve in the direction of the center line. The measured length is then cut into five parts of equal length, and the maximum heights (Z) in each of the equally partitioned intervals are averaged. It is expressed by the following equation.

$$Rz \cdot D = (1/5)(Z_1 + Z_2 + Z_3 + Z_4 + Z_5)$$

The surface of the covering sheet can further be given unevenness or a pattern by embossing, etc. in addition to the unevenness formed mainly by the elastic fine particles.

The covering sheet obtained as above is annealed if necessary.

(2) Production of the covering sheet having a surface layer with minute unevenness on the surface thereof and a substrate layer laminated on one side of the surface layer is described as follows.

When a composition which contains a thermoplastic elastomer and elastic fine particles as main components and is to become the surface layer and a thermoplastic resin to become a substrate layer are laminated to produce a laminated member of a sheet-like shape by co-extruding them together, the two layers can easily be laminated without trapping air therebetween, and the sheet can easily be produced in a single step. Therefore, the above factors are particularly preferable in actual production.

When the obtained laminated member is expanded, even if the surface layer has such a thickness that it would be difficult to expand it if the surface layer consisted of the single surface layer, the surface layer can easily be expanded together with the substrate layer.

The co-extruding forming refers to a method of producing a product having a multilayer structure by combining resins extruded respectively by using two extruders or more.

The combining method of the co-extruded resins roughly includes the feedblock method, the multimanifold method, and the multislot die method.

In the feedblock method, the combining is done by a special block provided immediately before the die. The method is also called a black box method.

In the multimanifold method, the die includes a necessary number of manifolds for the layers.

In the multislot die method, the die includes separate flows and the adhesion takes place immediately after coming out of the die.

In any one of these methods, a sheet having a plurality of layers can be produced. A combination of these methods (for example, a combination of the feedblock method and the multimanifold method) is also possible.

The sheet can be formed as follows. The thermoplastic elastomer which constitutes the surface layer and the elastic fine particles are mixed. Then, they are melt-kneaded and extruded by using a biaxial type extruder to be co-extruded and molded with a resin which is to become the substrate layer extruded from another extruder. The sheet can also be formed as follows. The thermoplastic elastomer and the elastic fine particles are kneaded and pelletized in advance. The pellet is then extruded by a regular extruder to be co-extruded and molded with a resin which is to become the substrate layer extruded from another extruder.

When the thermoplastic elastomer and the elastic fine particles are kneaded and pelletized in advance, the mixing of the thermoplastic elastomer and the elastic fine particles can be done by Banbury mixer, etc.

An example of the temperature condition for the above-described extrusion is 150 to 215° C. in a case where a composition for the surface layer using the thermoplastic elastomer is extruded.

Examples of materials constituting the above-mentioned substrate layer include the thermoplastic elastomer used for the above-mentioned surface layer; or a thermoplastic resin such as polystyrene, acrylic polymer, polycarbonate, polyvinyl chloride, polyethylene, polypropylene, ABS (acrylonitrile-butadiene-styrene copolymer), modified polyphenyleneoxide, polyphenylenesulfide, polyetherimide, polyetheretherketone, and ionomer.

When giving the covering sheet an enhanced cushion property and tender soft touch feeling when the surface layer is pressed, it is preferable that the substrate layer is made of a thermoplastic elastomer.

A temperature condition for extruding olefin type thermoplastic elastomer is generally 180 to 230° C.

The substrate layer can be made either of a single layer or of a plurality of layers.

(3) Production of the covering sheet having a surface layer with minute unevenness on the surface, an adhesive layer, and a substrate layer laminated in this order is described as follows.

If the adhesiveness between the surface layer and the substrate layer is poor in the above-described section (2), it is preferable to provide an adhesive layer between the two layers.

In this case, the surface layer, the adhesive layer, and the substrate layer are co-extruded to form a laminated member of a sheet-like shape in such a manner that they are laminated in that order, and then expanded.

Examples of the adhesive layers include pressure-sensitive adhesive and solvent type adhesives of the rubber type, acrylic type, urethane type, and silicone type; a layer made of hot-malt adhesive of, for example, ethylene-vinylacetate copolymer (EVA) type, chlorinated polyolefin, or styrene-isoprene-styrene block copolymer (SIS) type; a layer made of an adhesive resin such as polyolefin modified by an acid such as unsaturated polybasic acid and acid-modified SEBS (styrene-ethylene-butylene-styrene copolymer). These are called primer layers when appropriate.

For example, an after cure type adhesive of microcapsule cure type can also be used. Examples of the after cure adhesive include uncrosslinked unsaturated polyester type adhesives and uncrosslinked acrylic adhesives.

In a case where the surface layer made of thermoplastic elastomer of polyurethane type is laminated on the substrate layer made of a polyolefin type resin or elastomer, the adhesiveness can be improved by using those obtained by acid modification or graft modification of the material constituting the substrate, by blending these materials with unmodified polyolefin, or by laminating modified polyolefin substrate layer on the substrate sheet made of unmodified polyolefin.

(4) Production of the covering sheet having a surface layer with minute unevenness on the surface, an adhesive layer, a substrate layer, a foamed resin layer laminated in this order is described as follows.

This method is the same as the production method described in the above section (3) except that it further includes a lamination of the foamed resin layer on the substrate layer side after expanding the laminated member of a sheet-like shape.

In order to laminate the expanded laminated member of a sheet-like shape described above and the foamed resin layer together, a foamed resin sheet produced in advance is placed on the substrate layer side of the laminated member of a sheet-like shape which is being extruded and is in a malted condition, where they are passed between a pair of rollers thereby fusing and integrating for lamination (extrusion laminating method).

Depending on the situation, the foamed resin sheet can be extruded from another extruder immediately before the co-extruded laminated layer member of a sheet-like shape passes through the rollers thereby integrating them by pressing by the rollers.

Examples of a material for the above-mentioned foamed resin layer include polyolefin type resins (including those crosslinked) such as polypropylene and polyethylene; polystyrene type resins such as polystyrene and styrene-malaic anhydride copolymer; polyurethane type resins; polyvinyl chloride type resins; and various kinds of thermoplastic elastomer resins. Therefore, various kinds of foamed materials known in the art can be used. The expansion ratio of these foamed resin layer is usually in the range of about 5 to about 50, or preferably about 10 to about 50, or more preferably about 10 to about 40, in order to enhance the soft touch feeling when pressed.

The foamed resin layer can be of a single layer or of multiple layers. Furthermore, an adhesive layer may be laminated on the foamed resin layer in advance. In a case where the adhesiveness between the foamed resin layer and the core material (i.e., a molding body) onto which the foamed resin layer is laminated is poor, the adhesiveness between the two layers can be improved by providing an adhesive layer to the foamed resin layer in advance. Although the lamination of this adhesive layer can be done after the formation of the foamed resin layer, it is more efficient and preferable that the adhesive layer is laminated on an unexpanded green sheet constituting the foamed resin layer and then the green sheet is heated, thereby obtaining the foamed resin layer having the adhesive layer. A heat-sensitive adhesive can be used as an adhesive.

In order to improve design properties, a sheet provided with a pattern by printing, etc. can be laminated onto the above-mentioned substrate layer or foamed layer.

(Covering sheet obtained by a "method of producing the covering sheet" of the present invention)

As described above, covering sheets having various kinds of layer structures such as a sheet made of a single surface layer; a covering sheet having a surface layer and a substrate layer laminated on one side of the surface layer either directly or via an adhesive layer; a covering sheet having a surface layer, an adhesive layer, a substrate layer, and a foamed resin layer, can be obtained in the production method of the present invention.

Any of the above sheets for covering has minute unevenness formed on the surface of the surface layer, giving excellent matt feeling and, usually, soft touch feeling.

Thicknesses of the layers constituting the covering sheet obtained in the method of the present invention are generally in the range of 5 to 500 $\mu$m, or preferably 5 to 100 $\mu$m, for the surface layer; in the range of 500 to 5000 $\mu$m, or preferably about 1000 to about 3000 $\mu$m, for the foamed layer; in the range of 100 to 3000 $\mu$m, or preferably 200 to 1000 $\mu$m, for the substrate layer; and in the range of 2 to 500 $\mu$m, or preferably 5 to 50 $\mu$m, for the adhesive layer (primer layer).

Furthermore, if necessary, materials, e.g., colorants such as a pigment and a dye, an antioxidant, a UV absorber, a UV stabilizer (e.g., hindered amine), and a flame retardant can be added to the covering sheet (at least any one of the surface layer, the foamed layer, and the substrate layer).

As the colorant, a pigment and a dye which are generally used in a paint can be used. Examples of the pigment include titanium oxide, iron oxide, carbon black, a cyanine type pigment, and a quinacridone type pigment. Examples of the dye include an azo type dye, an anthraquinone type dye, an indigoid type dye, and a stilbene type dye. Metallic powders such as an aluminum flake, a nickel powder, a gold powder, and a silver powder can also be used as the colorant. It is preferred that these materials have a particle diameter as small as possible.

The covering sheet (the surface layer in the case of multilayer structure) is formed of a composition having thermoplastic elastomer and elastic fine particles as main components (usually 50 weight % or greater in the composition).

The matt feeling and soft touch feeling produced by the elastic fine particle of the previously-set amount may decrease or become different if the solid colorant such as above-mentioned pigments and metallic powder is added to the composition. Therefore, if the composition contains the solid colorant, a mixing amount (usually in the range of 20 to 200 parts by weight) of the above-mentioned elastic fine particles for the thermoplastic elastomer (100 parts by weight) may be changed.

Furthermore, in order to give various kinds of properties to a covering sheet produced according to the present invention, materials for providing various kinds of properties can be added. Examples of the materials for providing various kinds of properties include a conductive material, an anti-fogging agent, a photochromic compound, etc.

Furthermore, in order to improve a design property of the sheet, patterning by printing, etc. may be conducted. In a case where the covering sheet is formed of a plurality of layers, it is preferable to provide the printing on the reverse side of the surface layer (e.g., on the substrate layer).

(Use of a covering sheet)

A "covering sheet" or a covering sheet obtained by "a method of producing a covering sheet" can serve as various kinds of uses as described below.

In a method where a covering sheet is introduced in a mold and simultaneously adhered to a molding at the time of forming as for injection molding or injection—press molding, the sheet is closely contacted with the inside of the mold at room temperature or by heating, using vacuum forming or pressure forming. After that, regular molding is conducted. In a case where the covering sheet is not largely spread or where the mold does not have corners of small curvature, the covering sheet may not have to be closely contacted with the inside of the mold in advance.

According to the method in which moldings are successively produced as in extrusion molding, pultrusion, etc., a covering sheat may be adhered to the surface of a molding at the same time that moldings are successively produced prior to sizing. Alternatively, after sizing or cooling the molding, the sheet may be adhered to the molding.

In a method of introducing the covering sheet into the mold, it is performed after taken out of the mold and before the cooling and sizing, or it is performed during the sizing so as to curl in the covering sheet. In a method where the covering sheet is attached immediately after the molding, the covering sheet is attached by pressing rollers in such a manner that the sheet goes along the outer surface of the molding.

In vacuum (pressure) molding, a covering sheet can be laminated on a molding sheet which becomes the core material in advance and then molded, or the covering sheet can be laminated on the core material during or after the molding.

In the case where the sheet is adhered to long members made of a material such as a wooden material or an aluminum sash, a commercially available profile laminator can be used. In this case, it is preferred that an adhesive layer is disposed on the covering sheet so as to make adhesion with respect to the member satisfactory.

A covering sheet on which a pressure-sensitive adhesive is disposed can be adhered to the surface of a molding by using hands, a double vacuum forming machine (machine for adhesion), etc.

As to the molding resin used in the above description, any materials which are usually molded can be used. Examples of these materials include ABS (acrylonitrile-butadiene-styrene copolymer), polyethylene, polypropylene, polyvinyl chloride, polystyrene, polycarbonate, acrylic resin, polyetherimide, polyphenylenesulfide, polyamide (nylon), thermosetting elastomer, etc. These materials mixed with a glass fiber or an inorganic filling agent are further included in the examples.

(Method of producing a molding)

Next, a "method of producing a molding" of the present invention will be described more specifically.

A covering sheet used in this method is the covering sheet which is described in the sections 1 and 2 of "covering sheet".

Examples of method where a covering sheet and a molding resin are simultaneously molded together include the following.

(1) A covering sheet in introduced into a mold such that the surface layer thereof becomes the surface of the molding. Then, a molding resin for the molding is molded by injection molding or injection press molding while simultaneously attaching the covering sheet onto the front surface of the molding.

That is, the covering sheet is introduced into the mold such that the surface layer of the covering sheet is on the surface of the molding. Then, in a case of injection press molding, the mold is closed after introducing a molding resin into the mold to obtain the molding integrated with the covering sheet. In a case of injection molding, a molding resin is introduced into the mold after the mold is closed to obtain the molding integrated with the covering sheet.

(2) A covering sheet is pre-molded by pneumatic forming (vacuum forming and/or pressure forming) in advance. Then, this pre-molded sheet is introduced into a mold such that the surface layer thereof is on the surface of a molding to be obtained. Then, a molding resin for a molding is molded by injection molding or injection press molding while adhering the covering sheet onto the surface of the molding.

That is, in a case of stamping molding, the mold is closed after introducing the molding resin into the mold to obtain the molding. In a case of injection molding, a molding resin is introduced into the mold after the mold is closed.

In order to pre-mold the above-mentioned sheet, either (a) or (b) below can be performed. (a) The covering sheet is taken out from a mold for pre-molding, and introduced into a mold for a molding such that the surface layer side is on the front surface side. Then, the injection molding or injection press molding is performed to mold the main portion of a molding while integrating the pre-molded covering sheet on the surface of the main molding; or (b) the covering sheet is pre-molded in the mold for the molding, and the injection molding or injection press molding is performed to mold the main portion of a molding while integrating the pre-molded covering sheet on the surface of the main molding as in (a).

A molding can be obtained by molding a covering sheet without using a molding resin.

In that case, the covering sheet is introduced in the mold such that the surface layer thereof is on the front surface side of the moldings and the covering sheet is molded by vacuum forming or pressure forming such that the covering sheet is along the inner surface of the mold.

The pneumatic molding of the present invention refers to vacuum forming and/or pressure forming. Usually, plug assist molding known in the art, or a method where the sheet is once uniformly drawn by air pressure and then vacuum forming is performed can be used. Also, a mold used in the molding can be made of a resin instead of metal.

BEST MODE FOR CARRYING OUT THE INVENTION

Figure 1:
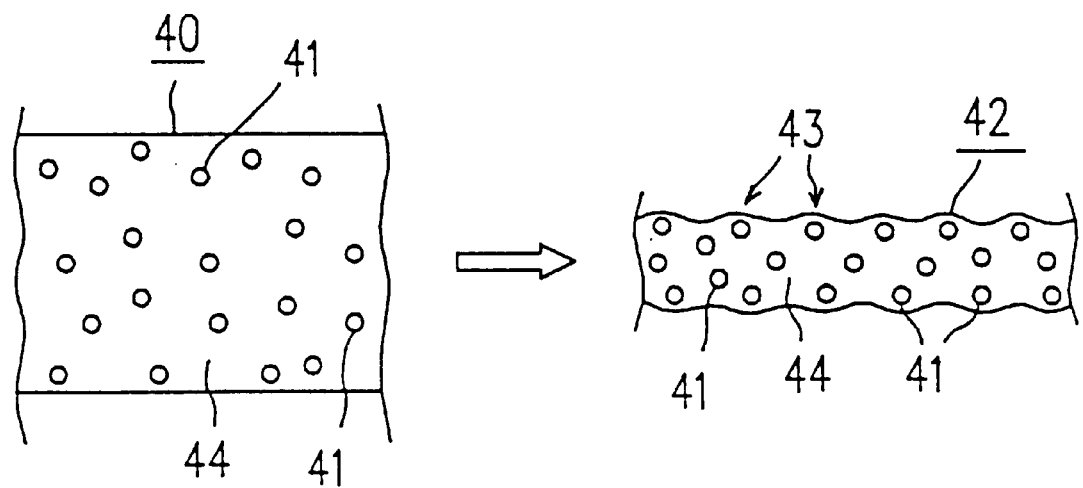
FIG. 1 is a view illustrating a method of the present invention of producing a covering sheet having minute unevenness by expanding the sheet.
Figure 2:
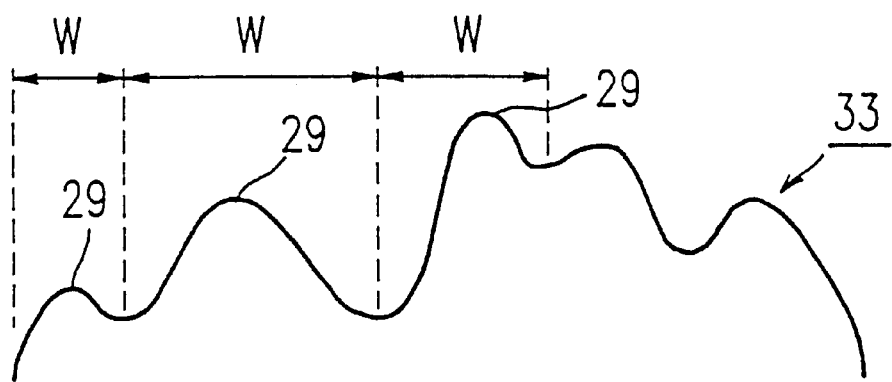
FIG. 2 is an enlarged schematic view illustrating an unevenness state on the sheet surface.
Figure 3:
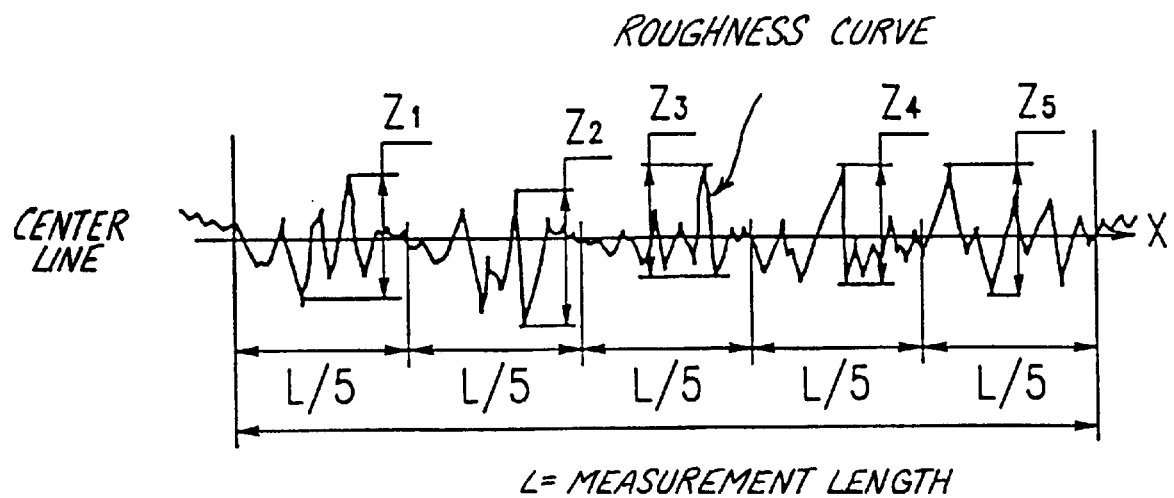
FIG. 3 shows a surface roughness curve of the covering sheet.
Figure 4:
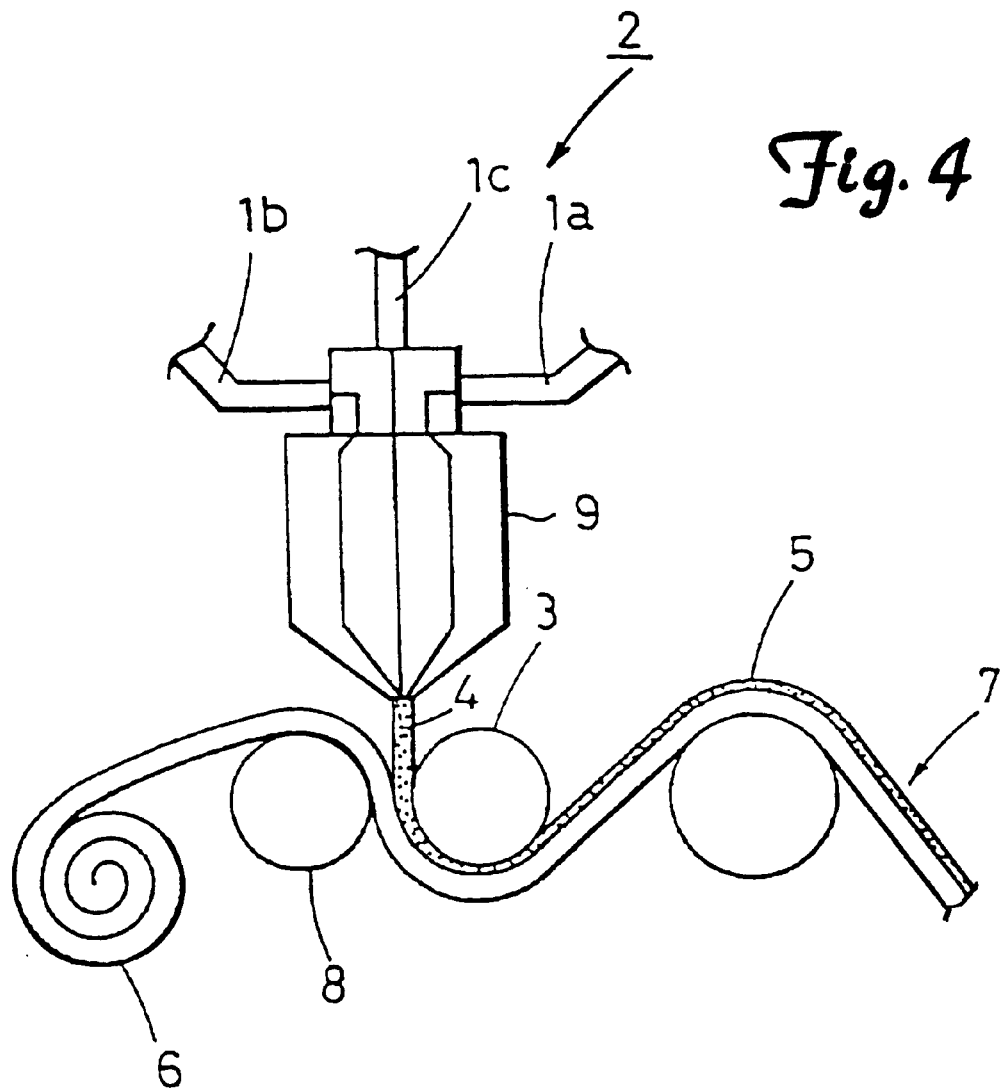
FIG. 4 is a view illustrating an example of an apparatus used in a method of producing the covering sheet of the present invention.
Figure 5:
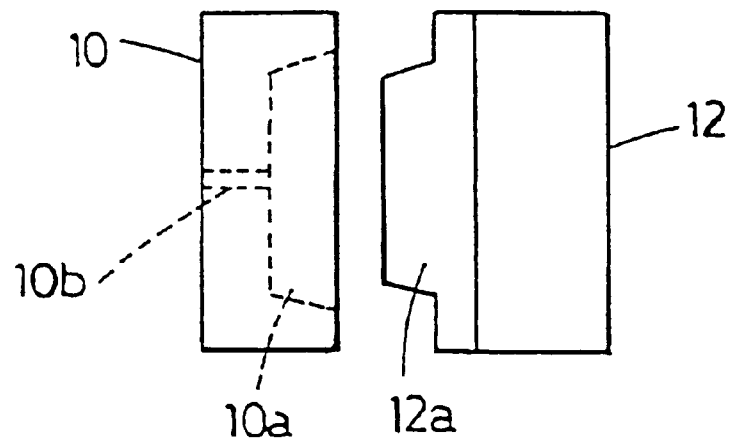
FIG. 5 is a view illustrating an injection molding machine used when a molding was produced using a covering sheet obtained in examples and comparative examples.

The present invention will be described in detail with reference to examples.

The term "parts" in the following examples refers to parts by weight in solid.
(1) The details on the materials used in the examples are as follows.
(A) Thermoplastic urethane elastomer.
E375MNAT: manufactured by Japan Miractran Co., Ltd., polyether type urethane elastomer, JIS A hardness 75.
E785QSDH: manufactured by Japan Miractran Co., Ltd., polyester type urethane elastomer, JIS A hardness 87.
ET260R: manufactured by Takeda Badische Urathane Industries Co., Ltd.
T-7890: manufactured by Dainippon Ink and Chemicals, Inc., non-yellowing type, JIS A hardness 91.
PN3429-215: manufactured by Morton, non-yellowing type, JIS A hardness 85.
E990P non-yellowing type: manufactured by Japan Miractran Co., Ltd.
(B) Elastic beads.
EAX15 (clear): manufactured by Sekisui Plastics Co., Ltd., elastic bead of crosslinked acrylic ester, mean particle diameter 15 μm.
EAX15 (black): manufactured by Sekisui Plastics co., Ltd., elastic bead of crosslinked acrylic ester, mean particle diameter 15 μm.
UB20 (black): manufactured by Sekisui Plastics Co., Ltd., elastic bead of crosslinked urethane, mean particle diameter 24 μm.
Decosilk (transparent NY18): manufactured by CU Chamia Uetikon AG, elastic bead of polyurethane, mean particle diameter 18 μm.
Bernock CFB-1-101-40 (clear): manufactured by Dainippon Ink and Chemicals, Inc., elastic bead of polyurethane, mean particle diameter 8 μm.
Bernoak CFB-620C: manufactured by Dainippon Ink and Chemicals, Inc., elastic bead of polyurethane, mean particle diameter 21 μm.
(C) Primer.
Super clon 822: chlorinated polyolefin, manufactured by Sanyo Kokusaku Pulp K.K.
Super clon 833: chlorinated polyolefin, manufactured by Sanyo Kokusaku Pulp K.K.
(D) Adhesive.
Tuftec M1943: manufactured by Asahi Chemical Industry Co., Ltd., acid modified styrene-ethylene-butylene-styrene copolymer (SEBS).
Admer QF500: manufactured by Mitsui Petrochemical Industries, Ltd., acid modified polyolefin.
Admer QF551: manufactured by Mitsui Petrochemical Industries, Ltd., acid modified polypropylene.
(E) Resin for substrate layer (following resins are blended).
Ultzex 2021L: manufactured by Mitsui Petrochemical Industries, Ltd., straight chain type low density polyethylene (LLDPE).
Hipol F650: manufactured by Mitsui Petrochemical Industries, Ltd., polypropylene.
Milastomer 8030N: manufactured by Mitsui Petrochemical Industries, Ltd., thermoplastic olefin elastomer.
Milastomer 5030N: manufactured by Mitsui Petrochemical Industries, Ltd., thermoplastic olefin alastomer.
(2) Co-rotating twin extruder used in the examples is PCM-30 manufactured by Ikegai Corporation.
(3) The details of the molding methods employed in the examples are as follows.
(A) Injection molding.

As shown in FIGS. 5 to 8, the injection molding machine has a movable part of the mold 10 having a concave 10a for molding and a passage hole 10b for making the inside of the movable part of mold 10 a vacuum, a stationary part of the mold 12 with a convex 12a, a heating platen 14 having holes for vacuum forming and pressure forming, which is provided between the molds 10 and 12 and can be moved out of therebetween, and a resin injection machine 15.

Figure 6:
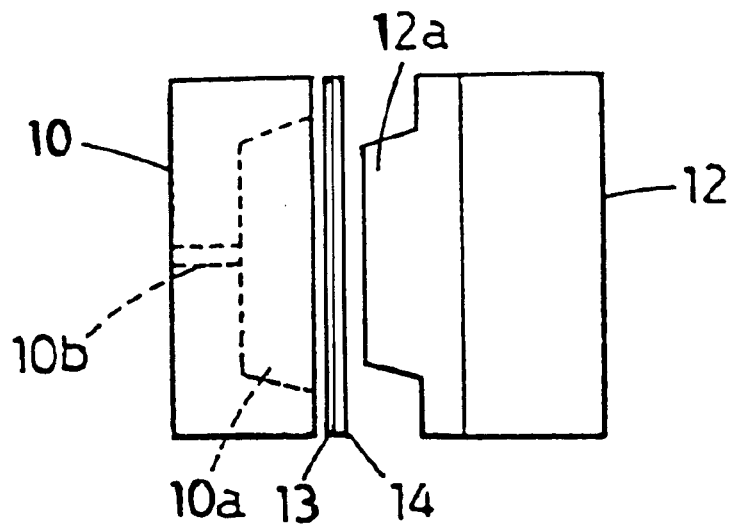
FIG. 6 is a view illustrating a state before the covering sheet is pre-molded by the injection molding machine of FIG. 5.

First, as shown in FIG. 6, a covering sheet 13 was placed between the movable part of the mold 10 and the heating platen 14. Then, the sheet 13 was heated with the heating platen 14, and was subjected to vacuum forming and/or pressure forming, whereby the sheet 13 was brought into contact with an inner face of the concave 10a of the mold 10 for pre-molding.

Figure 7:
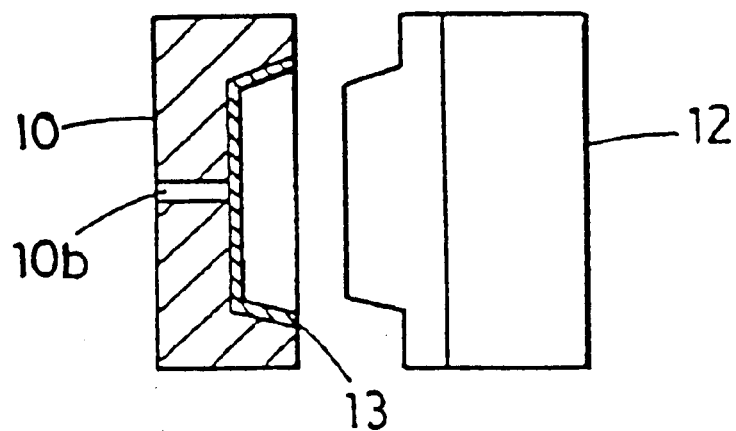
FIG. 7 is a view illustrating a state after the covering sheet is pre-molded by the injection molding machine of FIG. 5.
Figure 8:
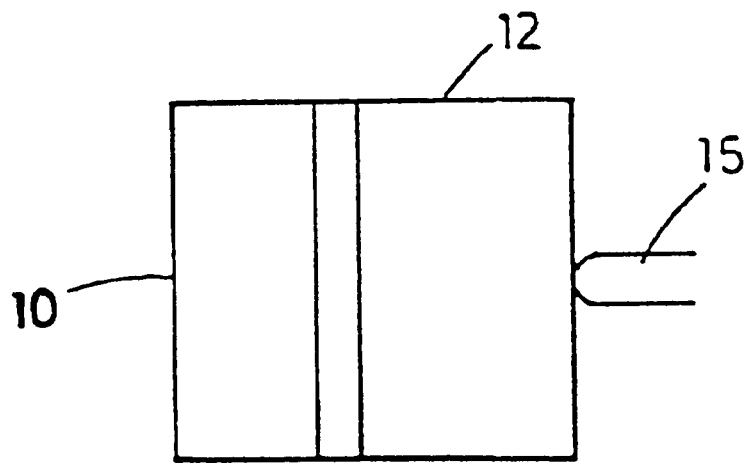
FIG. 8 is a view illustrating a state when a molding resin for a molding is being molded by injection molding.

Then, as shown in FIGS. 7 and 8, the heating platen 14 was taken out from between the molds 10 and 12, after which the mold 10 was moved into the fixed mold 12, whereby the molds 10 and 12 were connected to each other. Then, a molding resin was injected from the resin injection machine 15 into the cavity formed by the molds 10 and 12 with a nozzle tip end temperature of 230° C. The resin used was polypropylene (manufactured by Mitsubishi Petrochemical Co., Ltd., SC3). After the molding, a molding was taken out of the molds to obtain an injection molding.
(Injection press molding)

Figure 9:
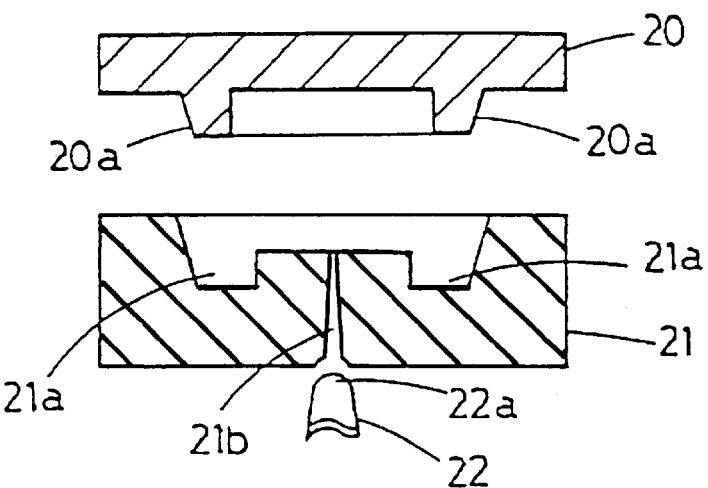
FIG. 9 is a view illustrating a injection press molding machine used when a molding was produced using a covering sheet obtained in examples and comparative examples.

As shown in FIG. 9, a molding machine has a cope 20, a drag 21, and a resin injection machine 22. On a lower face of the cope 20, a convex 20a is provided, and on an upper face of the drag 21, a concave 21a is provided so as to match with the convex 20a. At the center of the drag 21, a resin injecting path 21b is formed, and a nozzle 22a of the resin injection machine 22 is provided so as to come into contact with the resin injecting path 21b.

Figure 10:
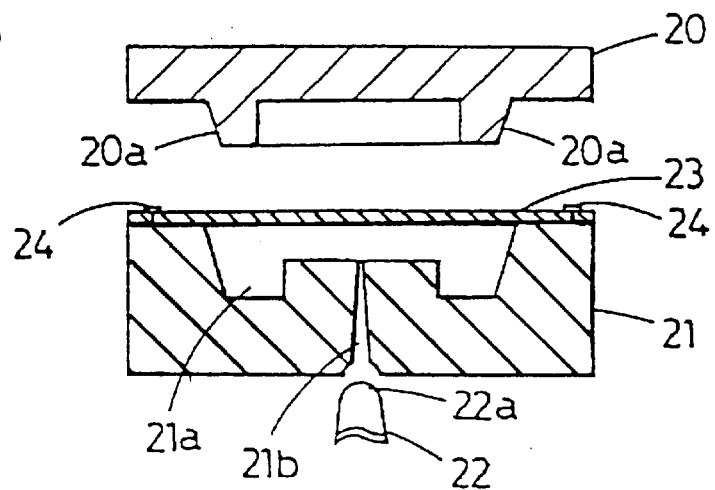
FIG. 10 is a view illustrating a state where a covering sheet is set in a drag of the injection press molding machine of FIG. 9.

First, as shown in FIG. 10, a covering sheet 23 was placed between the cope 20 and the drag 21 which were heated to a predetermined temperature, and a periphery of the sheet 23 was fixed with fixing pins 24 on a periphery of the drag 21. In a case where the sheet was formed of multiple layers, the sheet was placed such that the surface layer thereof faced the cope 20.

Figure 11:
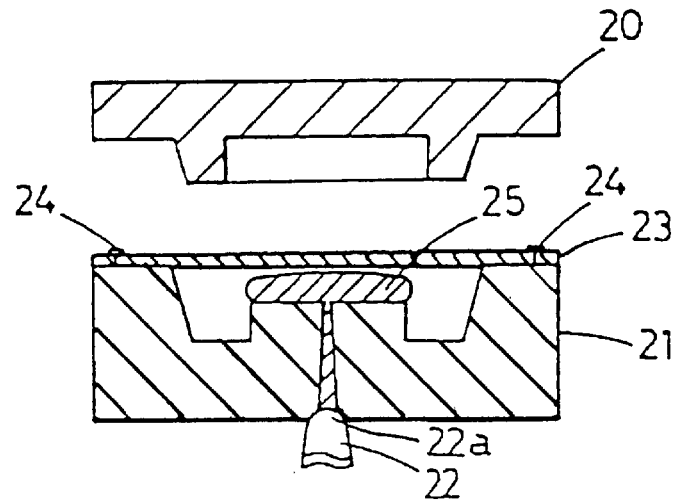
FIG. 11 is a view illustrating a state where a molding resin for a molding is injected in the drag of the injection press molding machine of FIG. 9 with the covering sheet being set.
Figure 12:
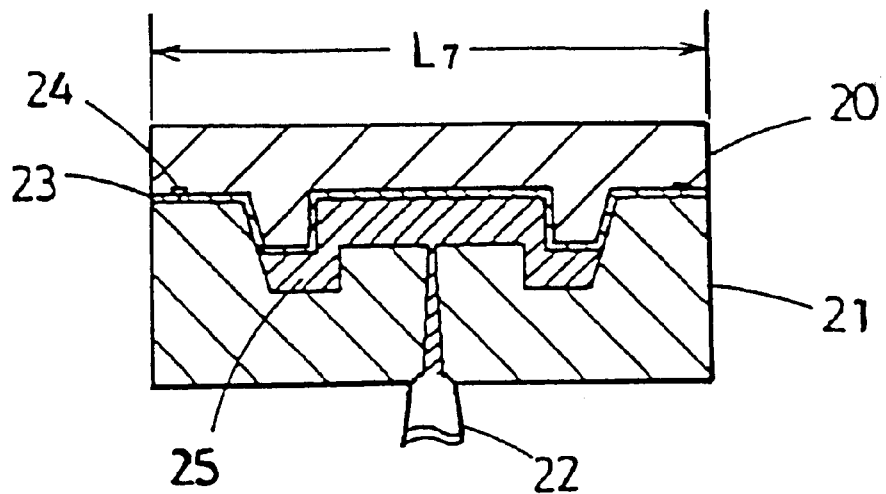
FIG. 12 is a view illustrating a state where the cope and the drag of FIG. 10 with the molding resin being injected are closed for injection press molding.
Figure 13:
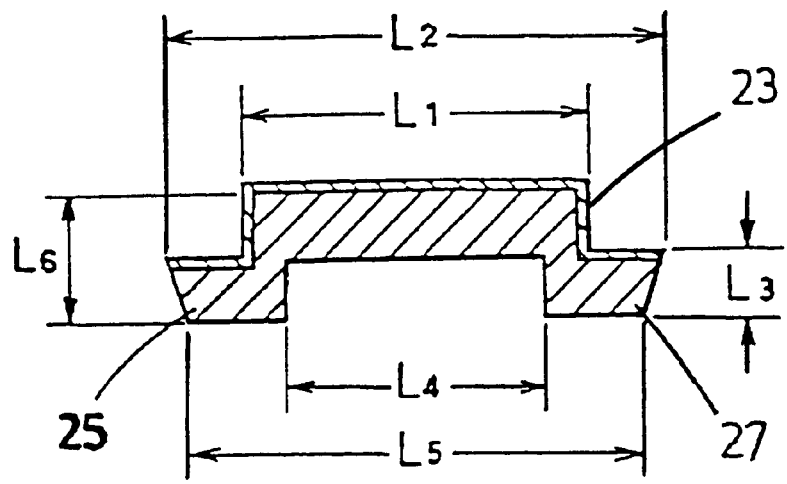
FIG. 13 is a cross-section of the molding obtained by the injection press molding.

Then, as shown in FIG. 11. a molding resin 25 was injected from the nozzle 22 of the resin injection machine 22 into the drag 21 with a nozzle tip end temperature of 210° C. Polypropylene (manufactured by Sumitomo Chemical Co., Ltd, AZ564 (PP. MI-30)) was used as the molding resin 25. Next, as shown in FIG. 12, the sheet 23 was molded by connecting the cope 20 to the drag 21 under predetermined pressure and at the same time the resin 25 alas molded by stamping molding, whereby a molding 27 in a shape shown in FIG. 13 was obtained. In FIGS. 12 and 13, $L_1$ is 200 mm, $L_2$ is 300 mm, $L_3$ is 30 mm, $L_4$ is 150 mm, $L_5$ is 280 mm, $L_6$ is 60 mm, and $L_7$ is 500 mm.

(Vacuum forming)

Figure 15:
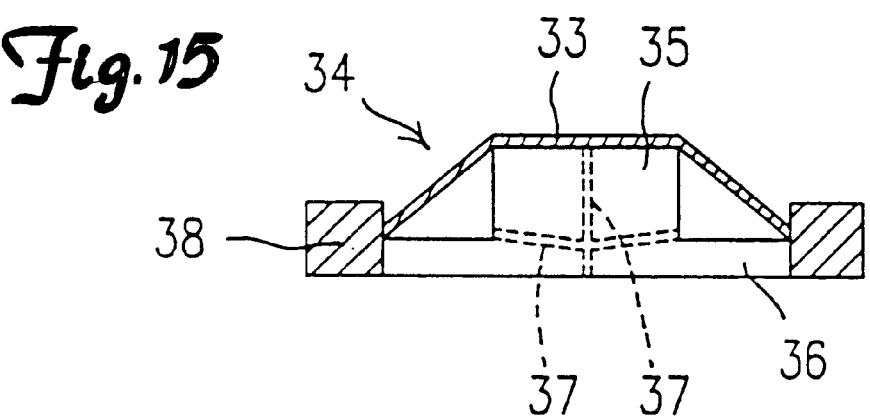
FIG. 15 is a view illustrating a state where the covering shoot is set to the vacuum forming machine when a molding is produced using a covering sheet obtained in examples and comparative examples.
Figure 16:
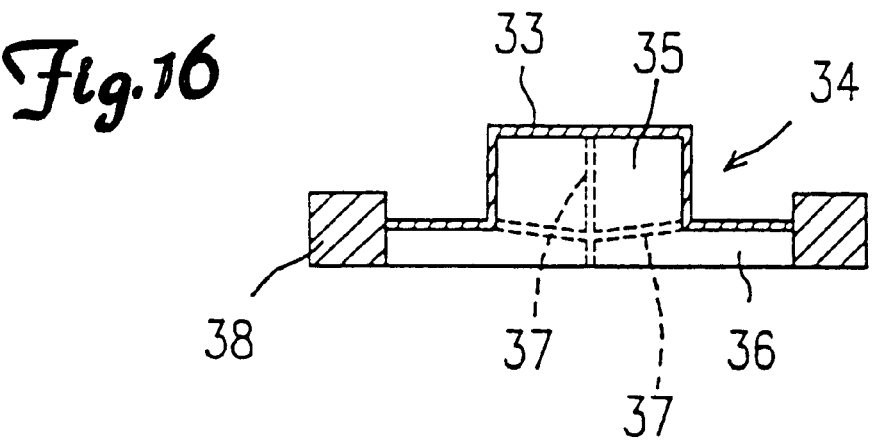
FIG. 16 is a view illustrating a state where the covering shoot is undergoing the vacuum, forming following the state of FIG. 13.

As shown in FIGS. 15 and 16, a forming pattern 34 has a rectangular convex 35 at the center and a flat portion 36 surrounding the convex 35. The convex 35 has though holes 37 both at the center and the side thereof in such a manner that a suction can be performed through the holes 37 by a suction machine (not shown in the figures) provided on the reverse side of the forming pattern 34.

Figure 14:
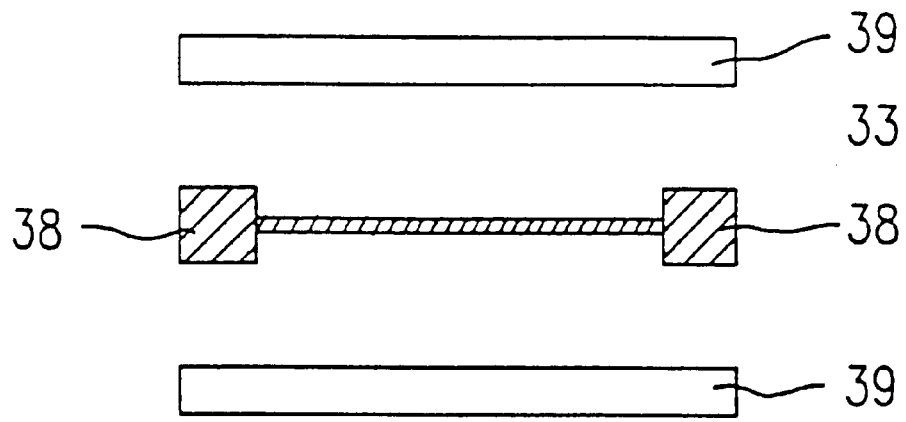
FIG. 14 is a view illustrating a heated state before vacuum forming when a molding is produced using a covering sheet obtained in examples and comparative examples.

First, as shown in FIG. 14, a covering sheet 33 is fixed on the periphery thereof by a fixing frame 38, and the sheet 33 is heated in this condition by heating plates 39 and 39 provided above and below of the sheet 33. Next, as shown in FIG. 15, the heated covering sheet 33 is moved onto the forming pattern 34. Then, a room between the forming pattern 34 and the sheet 33 is suctioned through the holes 37, whereby the sheet 33 is molded over the surface of the forming pattern 34 as shown in FIG. 16.

(4) A sheet, a covering sheet, or a molding obtained in the examples is evaluated as follows.

(A) Expandability of the sheet:

(Area of the cross-section of the lip of the mold)/(area of the cross-section of the sheet) was measured to express the expandability of the sheet.

(B) State of unevenness on the sheet surface: Observation was made by an electron microscope.

(C) Soft touch feeling:

Each of 30 panelists who touched the covering sheet or the molding gave a grade for the feeling according to the following standards. Those receiving 70 receiving less than 50 points were considered as unsatisfactory.

1. . . no soft touch,
2. . . relatively soft touch,
3. . . soft touch.

(D) Matt feeling: Indicated by a 60° specular glossiness value in conformity with JISK7105.

EXAMPLE 1

A mixture of 100 parts of thermoplastic urethane elastomer (E375MNAT) and 100 parts of elastic beads (EAX15 (clear)) was extruded downward from a co-rotating twin extruder at a resin temperature of 180° C. The sheet which was expanded while air-cooled and whose temperature became 125° C. at the location of 17 cm directly below the mold lip (2 mm in width, 130 mm in length) of the extruder was horizontally pulled by three pulling rollers rotating with a speed faster than a discharge speed of the resin while expanding the sheet, thereby obtaining the covering sheet (500 $\mu$m in thickness, 52 mm in width).

A barrel setting temperature condition of the kneading extruder was as follows. 140° C., 160° C., and 170° C. at the posterior, the middle section, and the anterior to the screw, respectively; 170° C. at the die section.

The results of evaluation on the expendability of the sheet, the state of unevenness on the surface of the covering sheet (width of convex and glossiness; applies to the following examples as well), and the soft touch feeling are shown in Table 1.

Also, upon inspection on the appearance of the covering sheet by an electron microscope, no abnormality such as the occurrence of cracks was observed. The sheet had matt-feeling (glossiness 1.5).

EXAMPLE 2

A covering sheet (thickness of 650 $\mu$m; width of 62 mm) was obtained similarly as in example 1 except that a mixture of 100 parts of thermoplastic urethane elastomer (E785QSDH) and 100 parts of elastic beads (EAX15 (black)) was extruded under the following setting temperature conditions with a resin temperature of 185° C., and that the temperature of the sheet at the location of about 17 cm directly below the mold lip was 130° C.

Barrel setting temperature conditions for the kneading extruder: 150° C., 165° C., and 175° C. at the posterior, the middle section, and the anterior to the screw, respectively; 175° C. at the die portion.

The results of evaluation on the expandability of the sheet, the state of unevenness on the surface of the covering sheet, and the soft touch feeling are shown in Table 1.

Also, upon visual inspection on the appearance of the covering sheet, it was confirmed that the sheet had no abnormality such as the occurrence of cracks and had matt feeling.

EXAMPLE 3

A mixture of 100 parts of thermoplastic elastomer (3375MNAT) and 100 parts of elastic beads (decosilk (transparent NY18)) was extruded under the following setting temperature condition with a resin temperature of 180° C. A temperature of the sheet at the location of about 17 cm directly below the mold lip was 125° C. Then, a covering sheet was obtained similarly as in example 1 except the pulling speed. The obtained sheet had a thickness of 350 $\mu$m and a width of 50 mm.

Barrel setting temperature condition for the kneading extruder: 140° C., 160° C., and 170° C. at the posterior, the middle section, and the anterior to the screw, respectively; 170° C. at the die portion.

The results of evaluation on the expandability of the sheet, the state of unevenness on the surface of the covering sheet, and the soft touch feeling are shown in Table 1.

Also, upon visual inspection on the appearance of the covering sheet, it was confirmed that the sheet had no abnormality such as the occurrence of cracks and had matt feeling.

EXAMPLE 4

A mixture of 100 parts of thermoplastic urethane elastomer (E375MNAT) and 50 parts of elastic beads (EAX15

(clear)) was extruded under the following setting temperature condition with a resin temperature of 180° C. A temperature of the sheet at the location of about 17 cm directly below the mold lip was 125° C. Then, a covering sheet was obtained similarly as in example 1 except the pulling speed. The obtained covering sheet had a thickness of 800 μm and a width of 81 mm.

Barrel setting temperature condition for the kneading extruder: 140° C., 160° C., and 170° C. at the posterior, the middle section, and the anterior to the screw, respectively; 170° C. at the die portion.

The results of evaluation on the expandability of the sheet, the state of unevenness on the surface of the covering sheet, and the soft touch feeling are shown in Table 1.

Also, upon visual inspection on the appearance of the covering sheet, it was confirmed that the sheet had no abnormality such as the occurrence of cracks and had matt feeling.

EXAMPLE 5

A covering sheet (400 μm of thickness; 43 mm of width) was obtained almost similarly as in example 1 except that a mixture of 100 parts of thermoplastic urethane elastomer (E785QSDH) and 150 parts of elastic beads (EAX15(clear)) was extruded under the following setting temperature condition with a resin temperature of 185° C., and that a temperature of the sheet at the location of about 17 cm directly below the mold lip was 130° C.

Barrel setting temperature condition for the kneading extruder: 150° C., 165° C., and 175° C. at the posterior, the middle section, and the anterior to the screw, respectively; 175° C. at the die.

The results of evaluation on the expandability of the sheet, the state of unevenness on the surface of the covering sheet, and the soft touch feeling are shown in Table 1.

Also, upon visual inspection on the appearance of the covering sheet, it was confirmed that the sheet had no abnormality such as the occurrence of cracks and had matt feeling.

EXAMPLE 6

A mixture of 100 parts of thermoplastic urethane elastomer (E785QSDH) and 150 parts of elastic beads (EAX15 (clear)) was extruded downward from a co-rotating twin extruder under the following setting temperature condition with a resin temperature of 180° C. The sheet which was expanded while air-cooled and whose temperature became 125° C. at the location of 17 cm directly below the mold lip (2 mm in width, 130 mm in length) was horizontally pulled by three pulling rollers rotating with a speed faster than a discharge speed of the resin while expanding the sheet, thereby obtaining the covering sheet having a thickness of 1.5 mm and a width of 120 mm in width).

The expandability of the sheet was 1.44.

A barrel setting temperature condition of the kneading extruder was as follows: 140° C., 160° C., and 170° C. at the posterior, the middle section, and the anterior to the screw, respectively; 170° C. at the die section.

A 50 mm×50 mm sample was taken from the obtained sheet and further drawn by biaxial stretching at 135° C. by a tenter drawing machine to obtain a covering sheet having 670 μm of thickness and 75 mm of width, which had a number of minute unevenness formed on the surface and soft touch feeling (final progression rate of the sheet is 2.0).

The results of evaluation on the expandability of the sheet, the state of unevenness on the surface of the covering sheet, and the soft touch feeling are shown in Table 1.

Also, upon visual inspection on the appearance of the covering sheet, it was confirmed that the sheet had no abnormality such as the occurrence of cracks and had matt feeling.

TABLE 1

|  | Example 1 | Example 2 | Example 3 | Example 4 | Example 5 | Example 6 |
| --- | --- | --- | --- | --- | --- | --- |
| Expandability of the sheet | 10 | 6.5 | 15 | 4 | 15 | 1.4 |
| Width of the convex on the sheet surface | 10 ~ 30 μm | 10 ~ 30 μm | 10 ~ 30 μm | 5 ~ 30 μm | 10 ~ 30 μm | 10 ~ 30 μm |
| Soft touch feeling | good | good | good | good | good | good |
| Glossiness | 1.5 | 1.9 | 1.2 | 2.8 | 0.8 | 0.8 |

* Hereinafter, the sample was further drawn by biaxial stretching.

COMPARATIVE EXAMPLE 1

Thermoplastic urethane elastomner (the same kind as was used in example 1) alone was extruded downward under the same conditions as in example 1 and expanded to obtain the sheet.

COMPARATIVE EXAMPLE 2

A mixture of 100 parts of thermoplastic urethane elastomer (E375MNAT) and 100 parts of elastic beads (EAX15 (clear)) was extruded horizontally in a sheet-like shape. The sheet was obtained under the same conditions as in example 1 except that the sheet was placed on a release polyethylene terephthalate film and not expanded.

COMPARATIVE EXAMPLE 3

A sheet was obtained under almost similar conditions as in example 1 except that a mixture of 100 parts of polypropylene resin (manufactured by Mitsubishi Petrochemical Co., Ltd.; MA8) and 100 parts of elastic beads (EAX15 (clear)) was extruded under the setting temperature condition below.

Barrel setting temperature condition for a kneading extruder: 190° C., 200° C., and 210° C. at the posterior, middle section, and anterior to the screw, respectively; 210° C. at the die section.

The results of evaluation on the expandability, the state of unevenness on the surface, and the soft touch feeling for the sheet obtained in comparative examples 1 to 3 are shown in Table 2.

TABLE 2

|  | Comparative example 1 | Comparative example 2 | Comparative example 3 |
| --- | --- | --- | --- |
| Expandability of the sheet | 10 | 1 (sheet not expanded) | 15 |
| Width of the convex on the sheet surface | None | Almost none | 10~30 μm Continuously formed |

TABLE 2-continued

|  | Comparative example 1 | Comparative example 2 | Comparative example 3 |
|---|---|---|---|
| Soft touch feeling | not good | not good | not good |
| Glossiness | 20 | 18 | 2.8 |

EXAMPLE 7

A PP type sheet of 2 mm thickness having a maleic acid modified polypropylene film of 10 μm thickness (manufactured by Mitsui Petrochemical Industries Co., Ltd.; Admer QF551) laminated on a polypropylene foamed sheet having expansion ratio of 25 was prepared. After heating the surface of the acid modified PP film to 160° C., the expanded sheet obtained in example 1 (not heated) was laminated by heating lamination to obtain a covering shoot. Rubber rollers at room temperature were used as laminating rollers.

When soft touch feeling was evaluated similarly as in example 1 on the surface layer of the covering sheet obtained, the soft touch feeling was excellent. The glossiness of the covering sheet was 1.5.

EXAMPLE 8

A surface of a polyurethane foamed sheet (expansion ratio of 20) of 3 mm thickness was heated to 150° C., and the expanded sheet (not heated) obtained in example 1 was laminated by heat lamination to obtain a covering sheet. Rubber rollers at room temperature were used as laminate rollers. When soft touch feeling was evaluated similarly as in example 1 on the surface layer of the covering sheet, the soft touch feeling was excellent. Also the glossiness of the covering sheet was 1.5.

EXAMPLE 9

A primer layer of a thermoplastic elastomer sheet (elastomer sheet of 400 μm thickness made of milastomer 8030N screen-printed with wood grain pattern and laminated with a primer (super clon 822) of 5 μm thickness) was heated to 140° C., and the expanded sheet (not heated) obtained in example 2 was laminated by heating lamination to obtain the covering sheet. Rubber rollers at room temperature were used as laminate rollers.

When soft touch feeling was evaluated similarly as in example 1 on the surface layer of the covering sheet obtained, the soft touch feeling was excellent. The glossiness of the covering layer was 1.9.

EXAMPLE 10

A sheet having a thermoplastic elastomer sheet (milastomer 8030N, 400 μm. thickness) laminated on a polypropylene foamed sheet of 2 mm thickness (expansion ratio of 25) by extruding lamination was obtained. The same primer layer used as in example 9 (5 μm thickness) was provided on the thermoplastic elastomer sheet of the above sheet. This primer layer was heated up to 140° C. and laminated with the expanded sheet obtained in example 2 by heating lamination to obtain a covering sheet. Rubber rollers at room temperature were used as laminate rollers.

When soft touch feeling was evaluated similarly as in example 1 on the surface of the covering sheet, the soft touch feeling was excellent. Also, the glossiness was 1.9.

EXAMPLE 11 a) Materials for a Surface Layer.

100 parts of thermoplastic urethane elastomer (E375MNAT).

120 parts of elastic beads (UB20(black)).

Above thermoplastic elastomer and the elastic beads were extruded by a biaxial kneading extruder, and pelletized by a cutter for soft material after cooling.

Barrel setting temperature for the extruder was as follows: 140° C., 160° C., and 170° C. at the posterior, the middle section, and the anterior to the screw, respectively; 170° C. at the die.

b) Materials for a Substrate Layer.

80 parts of thermoplastic olefin elastomer (milastqmer 8030N) pellet-blended with 20 parts of straight chain low density polyethylene (LLDPE).

c) Materials for an Adhesive Layer.

Acid modified SESS (TufTec M1943).

Above-mentioned a) surf ace layer, b) substrate layer, and c) adhesive layer were extruded downward from a three-layer co-extruder 2 having extruders 1a, 1b, and 1c of 50 φ, 40φ, and 40φ, respectively, manufactured by Research Laboratory of Plastics Technoloty Co., Ltd. and a multimanifold type die 9 in such a manner that they correspond to respective extruder. The resin temperatures were as follows; a) 180° C. at the surface layer, b) 210° C. at the substrate layer, and c) 210° C. at the adhesive layer. The die temperature was 190° C.

The laminated member 4 of a sheet-like shape which was air-cooled and expanded and whose temperature was about 170° C. at the location of about 15 cm directly below the mold lip (2 mm in width, 1 m in length) was expanded and pulled by a cooling pulling roller 3 at 40° C. which were rotating faster than the discharge speed of the resin. On the other hand, a foamed polypropylene sheet 6 (expansion ratio 25) was introduced and pressurized between the cooling pulling roller 3 and the laminate roller 8, whereby the laminated member 4 and the foamed sheet 6 were laminated and integrated to obtain a covering sheet 7.

Thicknesses of the surface layer, the adhesive layer, the substrate layer, and the foamed layer of the obtained covering sheet were as follows. 50 μm for the surface layer, 30 μm for the adhesive layer, 400 μm for the substrate layer, and 2000 μm for the foamed layer. The expendability of the sheet was 6, and the glossiness of the covering sheet was 1.5.

EXAMPLE 12 a) Materials for the Surface Layer.

100 parts of thermoplastic urethane elastomer (E785QSDH).

60 parts of elastic beads (EAX15 (black)).

Above thermoplastic elastomer and elastic beads were extruded from a biaxial kneading extruder and pelletized by a cutter for soft material after cooling.

Setting temperature for the extruder at each part was as follows: 150° C., 165° C., and 1750° C. at the posterior, the middle section, and the anterior to the screw, respectively; 175° C. at the die.

b) Materials for the Substrate Layer.

80 parts of thermoplastic olefin elastomer (milastomer 8030N) pellet-blended with 20 parts of LLDPE.

c) Materials for the Adhesive Layer.

Acid modified SEBS (TufTac M1943)

Above-mentioned a) the surface layer, b) the substrate layer, and c) the adhesive layer were co-extruded downward similarly as in example 11. The resin temperature was a) 180° C. at the surface layer, b) 210° C. at the substrate layer, and c) 210° C. at the adhesive layer. The die temperature was 190° C. The apparatus used and other conditions were similar to those used in example 11 except that the temperature of the laminated member 4 having a sheet-like shape at the location of about 15 cm directly below the die lip was about 180° C.

The laminated member 4 having a sheet-like shape was expanded by the pulling roller 3, and a foamed polypropylene sheet (expansion ratio of 25) was further laminated similarly as in example 11 to obtain a covering sheet 7. Upon observation by an electron microscope, minute unevenness formed on the surface of the surface layer 5 of the obtained covering sheet 7 was found.

Thicknesses of the surface layer, the adhesive layer, the substrate layer, and the foamed layer of the obtained covering sheet 7 were as follows. 100 µm for the surface layer, 100 µm for the adhesive layer, 300 µm for the substrate layer, and 3000 µm for the foamed layer. The expendability of the sheet was 5 and the glossiness of the covering sheet was 1.9.

EXAMPLE 13 a) Materials for the Surface Layer.

100 parts of thermoplastic urethane elastomer (E785QSDH).

100 parts of elastic beads (decosilk (transparent NY18)).

Above thermoplastic elastomer and elastic beads were extruded by a biaxial kneading extruder and pelletized by a cutter for soft material after cooling.

Barrel setting temperatures for the extruder were as follows: 140° C., 160° C., and 170° C. at the posterior, the middle section, and the anterior to the screw, respectively; 170° C. at the die.

b) Materials for the Substrate Layer.

80 parts of thermoplastic olefin elastomer (milastomer 8030N) pellet-blended with 20 parts of straight chain low density polyethylene (LLDPE).

c) Materials for the Adhesive Layer.

Acid modified SEBS (TufTec M1943)

Above a) surface layer, b) substrate layer, and c) adhesive layer were co-extruded downward similarly as in example 11. Respective resin temperatures were a) 180° C. for the surface layer, b) 210° C. for the substrate layer, and c) 210° C. for the adhesive layer. The die temperature was 190° C.

The obtained laminated member having a sheet-like shape was doubly drawn by a tenter drawing machine at 140° C. to obtain a sheet.

Upon observation by an electron microscope, minute unevenness formed on the surface of the surface layer of the obtained sheet was found.

Next, the surface of the substrate layer of the above sheet was heated up to 150° C., and a foamed polypropylene sheet (expansion ratio of 25) whose surface was heated up to 170° C. was laminated to obtain the covering sheet.

Thicknesses of the surface layer, the substrate layer, the adhesive layer, and the foamed layer of the obtained covering sheet were as follows. 50 µm for the surface layer, 300 µm for the substrate layer, 80 µm for the adhesive layer, and 2000 µm for the foamed layer. The expandability of the sheet was 6, and the glossiness of the covering sheet was 1.7.

EXAMPLE 14 a) Materials for the Surface Layer.

100 parts of thermoplastic urethane elaestomer (T-7890).

120 parts of elastic beads (UB20 (black)).

The above thermoplastic elastomer and the elastic beads were extruded by a co-rotating twin extruder and pelletized by a cutter for soft material after cooling.

Barrel setting temperatures for the extruder were as follows: 200° C., 210° C., and 210° at the posterior, the middle section, and the anterior to the screw, respectively; 205° C. at the die.

b) Materials for the Substrate Layer.

80 parts of thermoplastic olefin elastomer (milastomer 8030N) pellet-blended with 20 parts of straight chain low density polyethylene (LLDPE).

c) Materials for the Adhesive Layer.

Acid modified SEBS (TufTec M1943).

The above a) surface layer, b) substrate layer, and c) adhesive layer were co-extruded. The resin temperatures were as follows. 210° C. for a) the surface layer, 210° C. for b) substrate layer, and 210° C. for c) the adhesive layer. The die temperature was 190° C. The apparatus used and other conditions were similar to those in example 11 except that the temperature of the laminated member 4 having a sheet-like shape at the location of about 15 cm directly below the mold lip were about 160° C.

The laminated member 4 having a sheet-like shape was expanded by the pulling roller 3, and further laminated with the foamed polypropylene sheet 6 (expansion ratio of 15) an in example 11 to obtain the covering sheet 7. Upon observation by an electron microscope, minute unevenness formed on the surface layer 5 of the obtained covering sheet 7 were found.

Thicknesses of the surface layer, the adhesive layer, the substrate layer, and the foamed layer of the obtained covering sheet 7 were as follows: 100 µm for the surface layer, 70 µm for the adhesive layer, 1000 µm for the substrate layer, and 3000 µm for the foamed layer. The expandability of the sheet was 2, and the glossiness of the covering sheet was 2.3.

COMPARATIVE EXAMPLE 4

Immediately after extruding 100 parts of thermoplastic urethane elastomer (E375MNAT) by a biaxial kneading extruder, the sheet was pulled and expanded by a cooling pulling roller set at 40° C. At the same time, a foamed polypropylene sheet the surface of which was heated up to 170° C. was introduced between the pulling roller and a laminate roller paired with this pulling roller, and pressurized and laminated to obtain the covering sheet (the elastomer layer was called a surface layer).

Barrel setting temperatures for the extruder were as follows: 140° C., 180° C., and 170° C. at the posterior, the middle section, and the anterior to the screw; 170° C. for the die.

The expandability of the sheet was 10. The elastomer sheet was expanded by the pulling roller. However, observation by an electron microscope reveraled that minute unevenness was not formed on the sheet surface. The glossiness was 39.

EXAMPLES 15 TO 17, COMPARATIVE EXAMPLE 5: INJECTION MOLDING

Using the covering sheet obtained in the above examples 11 to 13, and comparative example 4, moldings were obtained by injection molding described in the above section (3)-(A) by an injection molding machine illustrated in FIGS. 5 to 8.

These moldings were referred to as examples 15, 16, 17, and comparative example 5, respectively.

The molding temperatures, the appearance and the soft touch feeling of the obtained moldings in each example and the comparative example are shown in Table 3.

TABLE 3

|  |  | Example 15 | Example 16 | Example 17 | Comparative example 5 |
|---|---|---|---|---|---|
| Sheet molding temperature (C°) | Surface layer side | 120 | 115 | 120 | 120 |
|  | Foamed layer side | 170 | — | — | — |
| Appearance |  | good | — | — | — |
| Soft touch feeling |  | good | — | — | No good |
| Glossiness |  | 1.2 | 1.7 | 1.5 | 43 |

EXAMPLE 18, COMPARATIVE EXAMPLE 6: INJECTION PRESS MOLDING

Using the covering sheet obtained in example 14 and comparative example 4, stamping forming was conducted according to a method described in the above section (3)-(B) by a stamping forming machine illustrated in FIGS. 9 to 12.

The pre-heat temperature, the appearance and the soft touch feeling of the obtained moldings in each example and the comparative example are shown in Table 4.

TABLE 4

|  |  | Example 18 | Comparative example 6 |
|---|---|---|---|
| Sheet molding temperature (° C.) | Surface layer side | 25 | 25 |
|  | Foamed layer side | 25 | 25 |
| Appearance |  | Good | Good |
| Soft touch feeling |  | Good | No good |
| Glossiness |  | 1.3 | 42 |

EXAMPLE 19

100 parts of thermoplastic polyester type urethane elastomer (E375MNAT) and 100 parts of elastic fine particles (EAX15 (clear)) were extruded downward in a sheet-like shape by a biaxial kneading extruder. The sheet which was air-cooled and expanded and whose temperature was about 125° C. at the location of about 17 cm directly below the mold lip (2 mm in width, 130 mm in length) was pulled by a cooled pulling roller (20° C.), and a first sheet to serve as a surface layer was obtained.

Barrel setting temperatures for the extruder were as follows: 140° C., 160° C., and 170° at the posterior, the middle section, and the anterior to the screw, respectively; 170° C. at the die.

The expandability of the sheet was 5. The first sheet was expanded until it reaches the pulling roller. Observation by an electron microscope revealed that minute unevenness was formed on the sheet surface.

The above-mentioned first sheet was laminated on the thermoplastic elastomer sheet (Milastomer 8030N) was calender-formed to obtain a sheet. Then a wood grain pattern was screen-printed on the sheet to obtain a second sheet serving as the substrate. Primer (super clon 822) having 5 μm thickness was then laminated thereon) at a heat laminating temperature (140° C. for primer layer) by heating lamination, and a covering sheet whose surface layer has a thickness of 100 μm and whose substrate layer has a thickness of 400 μm was obtained. Rubber rollers were used as the laminate rollers.

Using the covering sheet thus obtained, a molding was obtained by injection molding using the above-mentioned injection molding machine according to the above-mentioned method.

EXAMPLE 20

Immediately after 100 parts of thermoplastic urethane elastomer (E785OSDH) and 60 parts of elastic fine particles (EAX15 (black)) were extruded in a sheet-like shape by a biaxial kneading extruder, the extruded sheet was expanded and pulled by a cooled pulling roller to obtain a first sheet as a surface layer.

Barrel setting temperatures for the extruder were as follows: 150° C., 165° C., and 175° C. at the posterior, the middle section, and the anterior to the screw, respectively; 175° C. at the die.

The expendability of the sheet was 7. The first sheet was expanded until it reaches the pulling roller. Observation by an electron microscope revealed that minute unevenness was formed on the sheet surface.

The above-mentioned first sheet was laminated on the thermoplastic elastomer sheet E24 (a sheet obtained by calender-forming a material including 100 parts of milastomer and 20 parts of straight chain low density polyethylene (LLDPE), and laminated with a primer (super clon 833) having 5 μm thickness) serving an the substrate layer similarly as in the example 19 by heat lamination, whereby a covering sheet whose surface layer had a thickness of 50 μm and whose substrate layer has a thickness of 500 μm was obtained.

Using the obtained covering sheet, a molding was obtained by injection molding as in example 19.

COMPARATIVE EXAMPLE 7

Immediately after extruding the thermoplastic elastomer (E375MNAT) from a biaxial kneading extruder, the sheet-like shape was expanded and pulled by a cooled pulling roller to obtain a first sheet.

Barrel setting temperatures for the extruder were as follows: 150° C., 165° C., and 175° C. at the posterior, the middle section, and the anterior to the screw, respectively; 175° C. at the die.

The expandability of the sheet was 10. The sheet was drawn by the time it reaches the pulling roller. Observation by an electron microscope revealed that minute unevenness was not formed on the sheet surface.

Using the obtained sheet, a molding was obtained by injection molding as in example 19.

The appearance and soft touch feeling of the moldings obtained in examples 19 and 20 and in comparative example 7 are shown in Table 5 together with pre-molding temperatures.

TABLE 5

|  | Example 19 | Example 20 | Comparative example 7 |
|---|---|---|---|
| Sheet pre-heating temperature | 125 | 120 | 125 |
| Appearance | Good | — | — |
| Soft touch feeling | Good | — | No good |
| Glossiness | 1.5 | 1.9 | 42 |

EXAMPLE 21

Immediately after extruding 100 parts of thermoplastic urethane elaetomer (E375MNAT) and 120 parts of elastic fine particles (EAX15 (clear)), the sheet was expanded and pulled by a cooled pulling roller, thereby obtaining a first sheet serving as a surface layer.

Barrel setting temperatures for the extruder were as follows: 150° C., 165° C., and 175° C. at the posterior, the middle section, and the anterior to the screw, respectively; 175° C. at the die.

The expandability of the sheet was 5. The sheet was expanded by the time it reached the pulling roller. Observation by an electron miorosoope revealed that minute Unevenness was formed on the sheet surface.

The first sheet obtained was laminated on a polypropylene foamed sheet (expansion ratio of 20; laminated with acid modified SEBS as an adhesive layer on the surface of one side) serving as a substrate layer by heat lamination such that the surface temperature of the adhesive layer became 150° C., whereby a covering sheet whose surface layer has a thickness of 50 μm and whose substrate layer has a thickness of 1 mm was obtained. Rubber rollers at room temperature were used as laminate rollers.

Using the covering sheet thus obtained, a molding was obtained by stamping molding according to a method described in the above section (3)-(B).

EXAMPLE 22

Immediately after extruding 100 parts of thermoplastic urethane elaetomer (ET260R) and 70 parts of elastic fine particles (EAX15 (black)) by a biaxial kneading extruder, the extruded sheet-like member was expanded and pulled by a cooled pulling roller, thereby obtaining a first sheet serving as the surface layer.

Barrel setting temperatures for the extruder were as follows: 150° C., 165° C., and 175° C. at the posterior, the middle section, and the anterior to the scrow, respectively; 175° C. at the die.

The expendability of the sheet was 10. The first sheet was expanded by the time it reached the pulling roller. Observation by an electron microscope revealed that minute unevenness was formed on the sheet surface.

Thermoplastic elaestomer (milastomer 8030N) was laminated on a foamed sheet of PP (expansion ratio of 15) by extruding lamination. Then, an adhesive layer made of acid modified SEBS of 10 μm thickness was provided thereon to obtain a second sheet. Then, previously obtained first sheet was laminated on the second sheet by heat lamination, whereby a covering sheet was obtained. The heat lamination temperature was set such that the adhesive layer became 160° C., and rubber rollers at room temperature were used as laminate rollers.

Using the covering sheet thus obtained, a molding was obtained by injection press molding according to the method described in the above section (3)-(B).

The appearance and soft touch feeling of the molding obtained in the above examples 21 and 22 are shown in Table 6 together with pre-heating temperatures for the sheet.

TABLE 6

|  | Example 21 | Example 22 |
|---|---|---|
| Sheet pre-heating temperature | 120 | — |
| Appearance | good | — |
| Soft touch feeling | good | — |
| Glossiness | 1.5 | 1.8 |

EXAMPLE 23

Figure 17:
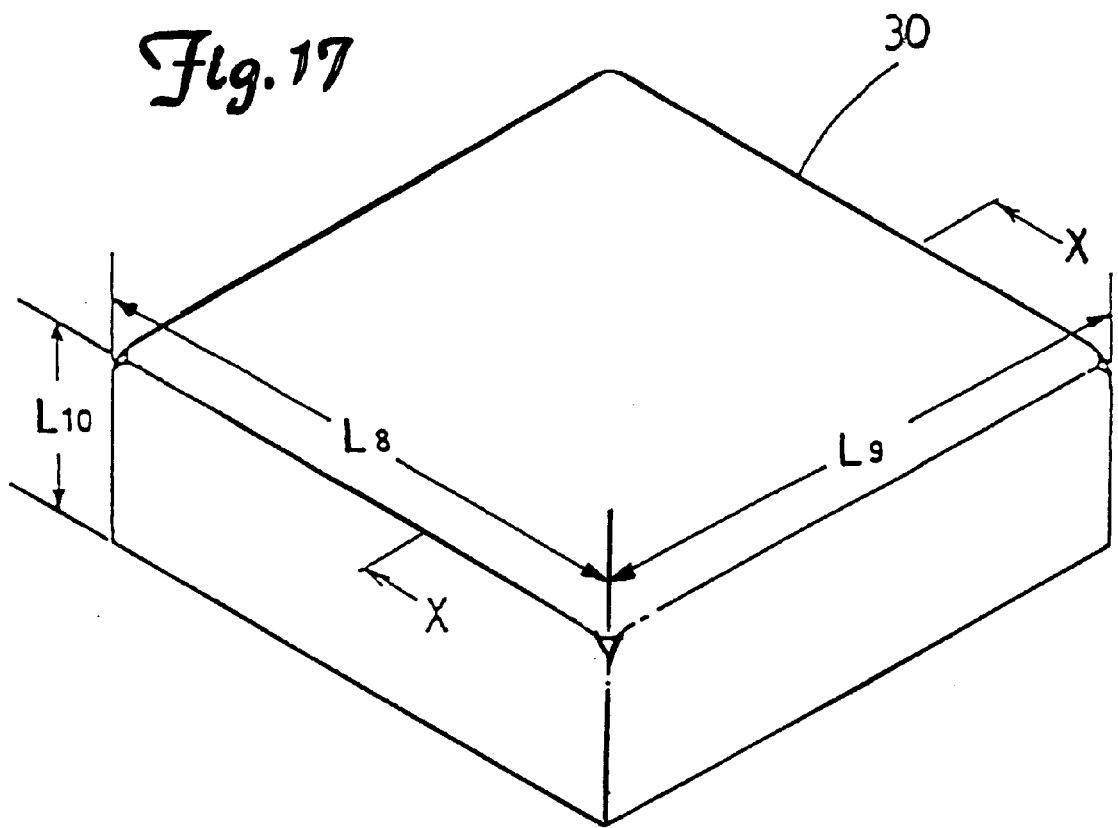
FIG. 17 is an isometric view of the molding obtained in examples.
Figure 18:
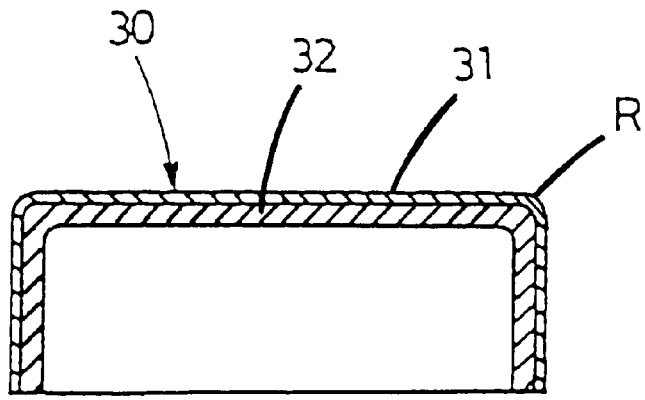
FIG. 18 is a cross-sectional view of the molding of FIG. 17.

Using the covering shoat obtained in example 19, a molding 30 illustrated in FIGS. 17 and 18 was obtained by a vacuum forming machine. In the figures, reference numeral 31 designates a surface layer and reference numeral 32 designates a substrate layer. The molding had dimensions as follows. $L_8$ is 159 mm, $L_9$ is 150 mm, $L_{10}$ is 50 mm, and R is 10 mm.

EXAMPLE 24

Using a covering sheet similar to one obtained in example 20, a molding 30 was obtained similarly an in example 23.

EXAMPLE 25

Using a covering sheet similar to one obtained in example 21, a molding 30 was obtained similarly as in example 23.

EXAMPLE 26

Using a covering sheet similar to one obtained in example 22, a molding 30 was obtained similarly as in example 23.

EXAMPLE 27

20 parts of inorganic filling agent was mixed into 100 parts of a polypropylene resin. Then, a sheet having 3 mm thickness was produced by extruding forming. Then, this sheet is laminated on the foamed sheet of the covering sheet obtained in example 19. Using the sheet thus obtained, a molding 30 was similarly obtained as in example 23.

COMPARATIVE EXAMPLE 8

Using the sheet obtained in comparative example 7, a molding 30 was similarly obtained as in example 23.

The appearance and soft touch feeling of the moldings obtained in the above examples 23 to 27 and comparative example 8 are shown together with sheet molding temperatures in Tables 7 and 8.

TABLE 7

|  | Example 23 | Example 24 | Example 25 |
|---|---|---|---|
| Sheet molding temperature | 120 | 130 | 130 |
| Appearance | good | — | — |
| Soft touch feeling | good | — | — |
| Glossiness | 1.4 | 1.9 | 1.3 |

TABLE 8

|  | Example 26 | Example 27 | Comparative Example 8 |
|---|---|---|---|
| Sheet molding temperature | 130 | 150 | — |
| Appearance | good | — | — |
| Soft touch feeling | good | — | no good |
| Glossiness | 2.5 | 1.4 | 53 |

EXAMPLE 28 a) Materials for the Surface Layer.

50 parts of thermoplastic urethane alestomer (PN3429-215).

50 parts of thermoplastic urethane elastomer (E990P non-yellowing).

110 parts of elastic fine particles (Bernock CFB-1-101-40 (clear)).

The above thermoplastic elastomer and elastic fine particles are extruded by biaxial kneading extruder and pelletized by a cutter for soft material after cooling.

b) Materials for the Adhesive Layer.

Acid modified polyolefin (admer QF500).

c) Materials for the Substrate Layer.

A mixture of the following by pellet-blending.

50 parts of thermoplastic olefin elastomer (milastomer 8030N).

30 parts of thermoplastic olefin elastomer (milastomer 5030N).

10 parts of LLDPE (manufactured by Mitsui Petrochemical Industries Co., Ltd., ultozex 2021L).

10 parts of PP (manufactured by Mitsui Petrochemical Industries Co., Ltd., F650).

Above-mentioned a) surface layer, b) substrata layer, and c) adhesive layer were extruded downward from a three-layer co-extruder having extruders 1a, 1b, and 1c of 40 φ, 40 φ, and 50 φ, respectively, manufactured by Research Laboratory of Plastics Technology Co., Ltd. and a feedblock type die in such a manner that they correspond to respective extruders. The resin temperatures were as follows; 190° C. at the surface layer, 230° C. at the substrate layer, and 190° C. at the adhesive layer. The die temperature was 200° C.

A laminated member of a sheet-like shape which was air-cooled and extended and whose temperature at the location of about 10 cm directly below the mold lip (1.0 mm in width, 500 mm in length) was expanded and pulled by a cooling pulling rollers at about 40° C. which was rotating with high speed faster than the discharge speed of the resin. On the other hand, a foamed polypropylene sheet (expansion ratio of 25) was introduced and pressurized between the cooling pulling roller and the laminate roller, whereby a covering sheet was obtained by integrating the laminated member and the foamed sheet. A roller whose surface which made contact with the surface layer was processed for leather-like embossment was used as the laminate roller.

Thicknesses of the surface layer, the adhesive layer, the substrate layer, and the foamed layer of the covering sheet thus obtained were as follows: 15 μm for the surface layer, 10 μm for the adhesive layer, 300 μm for the substrate layer, and 2 mm for the foamed layer. The expendability of the sheet was about 3.8. The glossiness of the covering sheet was 1.2.

EXAMPLE 29 a) Surface layer, b) substrate layer, and c) adhesive layer which were used in example 28 were extruded downward from a three-layer co-extruder having extruders 1a, 1b, and 1c of 40 φ, 40 φ, and 50 φ, respectively, manufactured by Research Laboratory of Plastics Technology Co., Ltd. and a feedblock type die in such a manner that they correspond to respective extruders. The resin temperatures were as follows. a) 190° C. at the surface layer, b) 230° C. at the substrate layer, and c) 190° C. at the adhesive layer. The die temperature was 200° C.

A laminated member of a sheet-like shape which was air-cooled and extended and whose temperature at the location of about 10 cm directly below the mold lip (1.0 mm in width, 500 mm in length) was expanded and pulled by a cooling pulling rollers at about 40° C. which was rotating with high speed faster than the discharge speed of the resin, thereby obtaining a covering sheet.

Thicknesses of the surface layer, the adhesive layer, and the substrate layer of the covering sheet thus obtained are as follows: 15 μm for the surface layer, 10 μm for the adhesive layer, and 300 μm for the substrate layer. The ratio of the cross-sectional area of the lip to the cross-sectional area of the sheet thus obtained was (cross-sectional area of the lip)/(cross-sectional area of the sheet)=about 3.8.

The surface roughness was Rz·D=16, and the glossiness was 1.9.

EXAMPLE 30

A covering sheet was obtained similarly as in example 29 except that the elastic fine particles in the surface layer were changed to UB20(black) (manufactured by Sekisui Plastics Co., Ltd., urethane elastic beads with mean particle diameter of 24 μm).

The surface roughness of the covering sheet thus obtained was Rz·D=26 μm, and the glossiness was 0.9.

EXAMPLE 31

A covering sheet was obtained similarly as in example 29 except that the elastic fine particles in the surface layer were changed to Bernock CFB-620C-40 (Dainippon Ink and Chemicals, Ltd., urethane elastic beads with mean particle diameter of 15 μm).

The surface roughness of the covering sheet thus obtained was Rz·D=21 μm, and the glossiness was 1.9.

EXAMPLE 32

A covering sheet was obtained similarly as in example 29 except that the elastic fine particles in the surface layer were changed to Bernock CFB-620C (Dainippon Ink and Chemicals, Ltd., urethane elastic beads with mean particle diameter of 45 μm).

The surface roughness of the covering sheet thus obtained was Rz·D=45 μm, and the glossiness was 1.5.

EXAMPLE 33 a) Surface layer, b) substrate layer, and c) adhesive layer which were used in example 28 were extruded downward from a three-layer co-extruder having extruders 1a, 1b, and 1c of 40 φ, 40 φ, and 50 φ, respectively, manufactured by Research Laboratory of Plastics Technology Co., Ltd. and a feedblock type die in such a manner that they correspond to respective extruders. The resin temperatures were as follows: a) 190° C. at the surface layer, b) 230° C. at the substrate layer, and c) 190° C. at the adhesive layer. The die temperature was 200° C.

The sheet was air-cooled and expanded and a laminated member of a sheet-like shape was obtained at the location of about 100 cm directly below the mold lip (1.0 mm in width, 500 mm in length).

Thicknesses of the surface layer, the adhesive layer, and the substrate layer of the covering sheet thus obtained were as follows. 35 μm for the surface layer, 25 μm for the adhesive layer, and 55 μm for the substrate layer. The expandability of the sheet was about 2. The glassiness of the covering sheet was 2.8.

EXAMPLE 34

A covering sheet was obtained similarly as in example 28 except that acid modified SEBS instead of acid modified polyolefin (admer QF500) as a material for the adhesive layer, and that crosslinked PP foam having expansion ratio of 15 was used as the foamed layer.

Thicknesses of the surface layer, the adhesive layer, the substrate layer, and the foamed layer of the covering sheet obtained were as follows: 15 μm for the surface layer, 10 μm for the adhesive layer, 300 μm for the substrate layer, and 3 mm for the foamed layer. The expandability of the sheet was about 3.8. The glossiness of the covering sheet was 1.2.

EXAMPLE 35

A covering sheet was obtained similarly as in example 34 except that 100 parts of thermoplastic urethane elastomer (FN3429-215) and 80 parts of elastic fine particles (Bernock CFB-1-101-40 (clear)) were used as materials for the surface layer.

Thicknesses of the surface layer, the adhesive layer, the substrate layer, and the foamed layer of the covering sheet obtained were as follows: 15 μm for the surface layer, 10 μm for the adhesive layer, 300 μm for the substrate layer, and 3 mm for the foamed layer. The expandability of the sheet was about 3.8. The glossiness of the covering sheet was 1.5.

EXAMPLE 36

A covering sheet was obtained similarly as in example 28 except that KS025 manufactured by Himont Inc. (thermoplastic olefin elastomer) was used as a material for the substrate layer.

Thicknesses of the surface layer, the adhesive layer, the substrate layer, and the foamed layer of the covering sheet obtained were as follows: 15 μm for the surface layer, 10 μm for the adhesive layer, 300 μm for the substrate layer, and 2 mm for the foamed layer. The expandability of the sheet was about 3.8. The glossiness of the covering sheet was 1.5.

EXAMPLE 37

A covering sheet was obtained similarly as in example 28 except that PP foam having expandability of 15 was used as the foamed layer.

Thicknesses of the surface layer, the adhesive layer, the substrate layer, and the foamed layer of the covering sheet obtained were as follows: 15 μm for the surface layer, 10 μm for the adhesive layer, 300 μm for the substrate layer, and 3 mm for the foamed layer. The expandability of the sheet was about 3.8. The glossiness of the covering sheet was 1.5.

EXAMPLE 38

A covering sheet was obtained similarly as in example 28 except that KS052 manufactured by Himont Inc. (thermoplastic olefin elastomer) was used as a material for the substrate layer.

Thicknesses of the surface layer, the adhesive layer, the substrate layer, and the foamed layer of the covering sheet obtained were as follows: 15 μm for the surface layer, 10 μm for the adhesive layer, 300 μm for the substrate layer, and 2 mm for the foamed layer. The expandability of the sheet was about 3.8. The glossiness of the covering sheet was 1.5.

EXAMPLE 39

A covering sheet was obtained similarly as in example 28 except that the substrate layer was made of two layers, and that the substrate layer 1 (on the adhesive layer side) had the same construction as in example 28 and the substrate 2 (on the foamed layer side) was made of KS025 manufactured by Himont Inc.

Thicknesses of the surface layer, the adhesive layer, the substrate layer, and the foamed layer of the covering sheet obtained were as follows: 15 μm for the surface layer, 10 μm for the adhesive layer, 300 μm for the substrate layer (50 μm for the substrate layer 1, 250 μm for the substrate layer 2), and 2 mm for the foamed layer. The expandability of the sheet was about 3.8. The glossiness of the covering sheet was 1.5.

EXAMPLES 40 TO 43

Using the covering sheets obtained in above examples 28, 29, 30, and 36, moldings were obtained by injection molding according to the method described in the above-section (3)-(A).

The covering sheets thus obtained are referred to as examples 40, 41, 42, and 43, respectively.

The appearance of any of the moldings obtained were excellent, and they had matt feeling and soft touch feeling.

EXAMPLES 44 AND 45

Using the covering sheet obtained in the above examples 34 and 35, moldings were obtained by injection press molding according to the method described in the above section (3)-(B).

The appearance of any of the moldings obtained were excellent, and they had matt feeling and soft touch feeling.

EXAMPLES 46 TO 49

Using the covering sheets obtained in the above examples 28, 29, 30, and 36, moldings ware obtained by vacuum forming (forming temperatures were 120° C. on the surface layer side and 140° C. on the foamed layer side) according to the method described in the above section (3)-(C).

The appearance of any of the moldings obtained were excellent, and they had matt feeling and soft touch feeling.

EXAMPLE 50

Using the covering sheet obtained in the above example 37, vacuum forming was performed according to the method described In the above section (3)-(C) (vacuum forming temperatures were 120° C. on the surface layer side and 140° C. on the foamed layer side).

Figure 21:
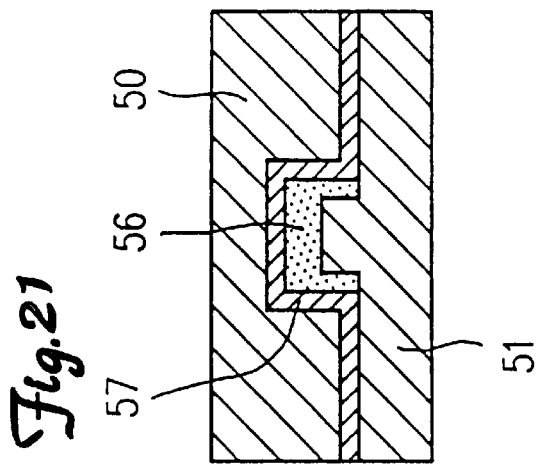
FIG. 21 is a view illustrating a state where the cope is closed on the drag to which a molding resin is injected for injection press molding.

Then, injection press molding was performed using a injection press molding machine illustrated in FIGS. 19 to 21 as follows.

This injection press molding machine includes a cope 50 having a concave 53, a drag 51 having a convex 52, and a resin injection machine 54.

Figure 19:
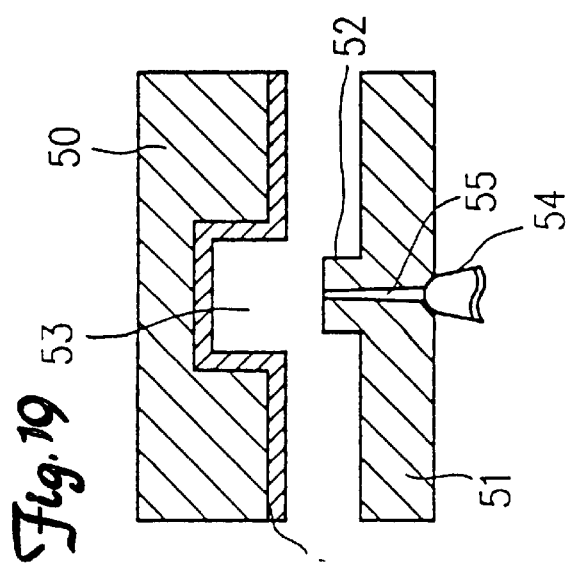
FIG. 19 is a view illustrating that a pre-molded member is set to a cope of the injection press molding machine used when a molding is produced, using the covering sheet obtained in examples and comparative examples.

First, as shown in FIG. 19, a pre-molded sheet 57 was fixed to the cope 50 of the injection press molding machine (such that the surface layer of the covering sheet faces up).

Figure 20:
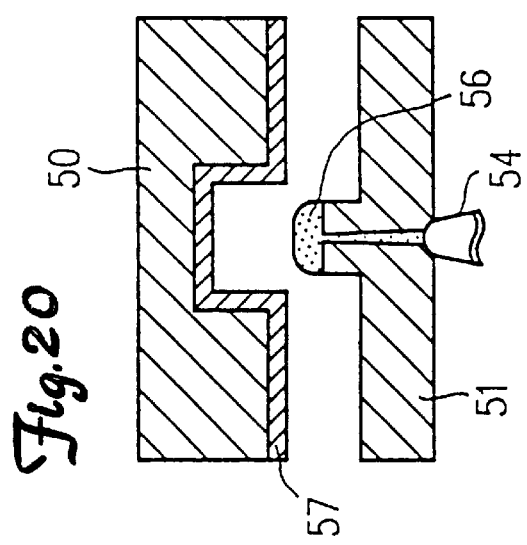
FIG. 20 is a view illustrating a state where the covering sheet is set to the cope of the injection press molding machine of FIG. 19 and a molding resin is filled on the drag of the same machine.

Next, as shown in FIG. 20, a forming resin was injected from a nozzle of the resin injection machine 54 into the drag 51 with a nozzle tip and temperature of 210° C. Polypropylene (AZ564 manufactured by Sumitomo Chemical Co., Ltd.) was used as the forming resin. Next, as shown in FIG. 21, by closing the cope 50 with a prescribed pressure, the forming resin was molded by stamping, thereby obtaining a molding.

The appearance of any of the molding obtained were excellent, and they had matt feeling and soft touch feeling.

FIELD FOR THE INVENTION TO BE USED

The covering sheet of the present invention gives soft touch feeling and matt feeling to the surface of a product, so that it is useful for covering any object which a human being (possibly) touches either consciously or unconsciously.

Examples of the present invention used as a covering include the following.
1. Interior members of an automobile such as a door panel, an instrument panel, a handle, a gear lever knob, a door knob, an arm rest, various switches, a seat, a ceiling material, etc.
2. Housings for household electrical goods such as portable products (a telephone, a cassette tape recorder, a compact disk, a television, etc.), a telephone, a refrigerator, a television, switches of these goods, etc.
3. Housings for OA products such as a personal computer, a printer, a key board, etc.
4. Furniture products such as chairs, desks, tables, wardrobes, etc.
5. Architectural interior structures such as sashes, splints, various kinds of doors, wall paper, sanitary goods, and bath products such as a seat of a toilet bowl, bathtubs, chairs, mats, shelves, etc.
6. Sports goods such as grips of bats, rackets, golf clubs, and the like, protective pads, etc.
7. Daily goods and stationery such as various kinds of housings, cases, containers, etc.
8. Others such as benches, chairs, stands, sofas, pillows, etc.

Since the molding obtained in the present invention has a matt feeling or soft touch feeling on the surface thereof, it is suitably applied to each of the above-mentioned parts.

We claim:

1. A method of producing a molding comprising a molding body made of a molding resin and a coating film provided on a surface of said molding body and formed of a covering sheet, comprising the steps of:
   introducing a covering sheet into a mold, the covering sheet having a minute unevenness on a surface thereof, said covering sheet comprising:
      a surface layer made of a composition containing as main components a urethane based thermoplastic elastomer and elastic fine particles and having the minute unevenness on the surface thereof;
      an adhesive layer made of polyolefin modified by an acid or a styrene-ethylene-butylene-styrene copolymer modified by an acid; and
      a substrate layer made of olefin based thermoplastic elastomer;
      wherein said surface layer, said adhesive layer, and said substrate are laminated in this order;
   such that said surface layer of said covering sheet is proximate to a surface side of the mold;
   introducing molding resin into said mold thus defining a molding body; and
   integrating said covering sheet to a surface of said molding body by molding said covering sheet and said molding body within said mold.

2. A method of producing a molding comprising a molding body made of a molding resin and a coating provided on a surface of said molding body and formed of a covering sheet, comprising the steps of:
   pre-molding a covering sheet within a mold by vacuum forming and/or pressure forming thus forming a pre-molded sheet;
   introducing molding resin into said mold thus defining a molding body; and
   integrating said pre-molded covering sheet to a surface of said molding body by molding said pre-molded covering sheet and said molding body within said mold, the covering sheet having a minute unevenness on a surface thereof, said covering sheet comprising:
      a surface layer made of a composition containing as main components a urethane based thermoplastic elastomer and elastic fine particles and having the minute unevenness on the surface thereof;
      an adhesive layer made of polyolefin modified by an acid or a styrene-ethylene-butylene-styrene copolymer modified by an acid; and
      a substrate layer made of olefin based thermoplastic elastomer;
      wherein said surface layer, said adhesive layer, and said substrate are laminated in this order.

3. A method of producing a molding, comprising the steps of:
   introducing a covering sheet into a mold, the covering sheet having a minute unevenness on a surface thereof, said covering sheet comprising:
      a surface layer made of a composition containing as main components a urethane based thermoplastic elastomer and elastic fine particles and having the minute unevenness on the surface thereof;
      an adhesive layer made of polyolefin modified by an acid or a styrene-ethylene-butylene-styrene copolymer modified by an acid; and
      a substrate layer made of olefin based thermoplastic elastomer;
         wherein said surface layer, said adhesive layer, and said substrate are laminated in this order;
         such that said surface layer of said covering sheet is proximate to a surface side of the molding; and
         forming said covering sheet by vacuum forming and/or pressure forming such that said covering sheet lines along an inside of the mold.

4. The method of producing a molding according to claim 1 further comprising laminating a foamed resin layer on a rear side of said substrate layer.

5. The method of producing a molding according to claim 2 further comprising laminating a foamed resin layer on a rear surface side of said substrate layer.

6. The method of producing a molding according to claim 3 further comprising laminating a foamed resin layer on a rear surface side of said substrate layer.

* * * * *